United States Patent
Rogers et al.

(10) Patent No.: US 7,487,154 B2
(45) Date of Patent: *Feb. 3, 2009

(54) METHOD AND APPARATUS FOR GENERATING PAGE-LEVEL SECURITY IN A COMPUTER GENERATED REPORT

(75) Inventors: Paul A. Rogers, Fremont, CA (US); Nicolas C. Nierenberg, Hillsborough, CA (US)

(73) Assignee: Actuate Corporation, San Mateo, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 11/049,908

(22) Filed: Feb. 1, 2005

(65) Prior Publication Data
US 2005/0203819 A1 Sep. 15, 2005

Related U.S. Application Data

(63) Continuation of application No. 09/450,813, filed on Nov. 29, 1999, now Pat. No. 6,859,805.

(51) Int. Cl.
G06F 17/30 (2006.01)
G06F 17/00 (2006.01)

(52) U.S. Cl. .................. 707/9; 709/217; 715/204; 726/27

(58) Field of Classification Search .......... 707/9; 709/217; 715/204; 726/27
See application file for complete search history.

(56) References Cited

U.S. PATENT DOCUMENTS

| | | | |
|---|---|---|---|
| 5,469,556 A * | 11/1995 | Clifton | 711/163 |
| 5,473,687 A * | 12/1995 | Lipscomb et al. | 705/51 |
| 5,594,796 A * | 1/1997 | Grube et al. | 380/270 |
| 5,727,145 A * | 3/1998 | Nessett et al. | 726/5 |
| 5,946,269 A * | 8/1999 | Jang | 365/236 |
| 5,987,506 A * | 11/1999 | Carter et al. | 709/213 |
| 6,002,398 A * | 12/1999 | Wilson | 715/777 |
| 6,014,666 A * | 1/2000 | Helland et al. | 707/9 |
| 6,029,245 A * | 2/2000 | Scanlan | 726/4 |
| 6,101,513 A * | 8/2000 | Shakib et al. | 715/527 |
| 6,105,027 A * | 8/2000 | Schneider et al. | 707/9 |
| 6,148,379 A * | 11/2000 | Schimmel | 711/152 |
| 6,260,044 B1 * | 7/2001 | Nagral et al. | 707/102 |
| 6,401,185 B1 * | 6/2002 | Sexton et al. | 711/209 |
| 6,434,607 B1 * | 8/2002 | Haverstock et al. | 709/217 |
| 6,442,696 B1 * | 8/2002 | Wray et al. | 726/5 |
| 6,442,748 B1 * | 8/2002 | Bowman-Amuah | 717/108 |

(Continued)

*Primary Examiner*—Shahid A Alam
*Assistant Examiner*—Alexandria Y Bromell
(74) *Attorney, Agent, or Firm*—Weaver Austin Villeneuve & Sampson LLP

(57) ABSTRACT

Methods and computer program products are disclosed for generating and viewing an electronic report having security features that allow for "virtual bursting" of the report for multiple users. A single report having multiple pages is generated such that each or some of the pages have security tags that are compared to a security identifier list of a particular user that acts as a security clearance for that user. Through this comparison, a subset of pages from the report is formed which makes up a "report" from the user's point of view that contains only data the user is allowed to see. This allows multiple users to view only authorized portions of a single report having page-level security determined by level breaks in the data.

37 Claims, 16 Drawing Sheets

U.S. PATENT DOCUMENTS

| | | | |
|---|---|---|---|
| 6,598,046 B1 * | 7/2003 | Goldberg et al. | 707/5 |
| 6,772,156 B1 * | 8/2004 | Rogers et al. | 707/9 |
| 6,859,805 B1 * | 2/2005 | Rogers et al. | 707/9 |
| 6,874,010 B1 * | 3/2005 | Sargent | 709/203 |
| 6,925,468 B1 * | 8/2005 | Bobbitt et al. | 707/102 |
| 7,100,195 B1 * | 8/2006 | Underwood | 726/2 |

* cited by examiner

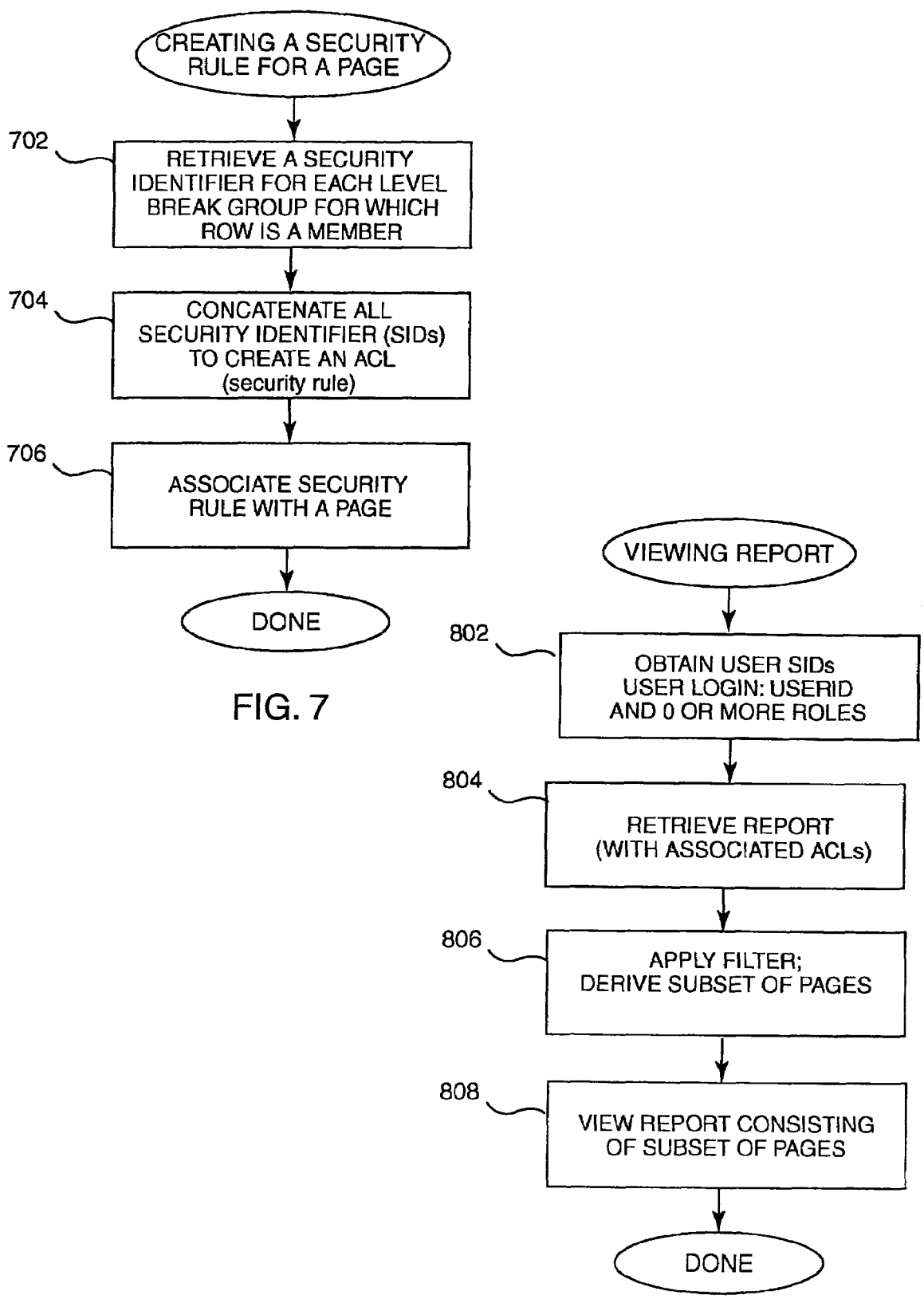

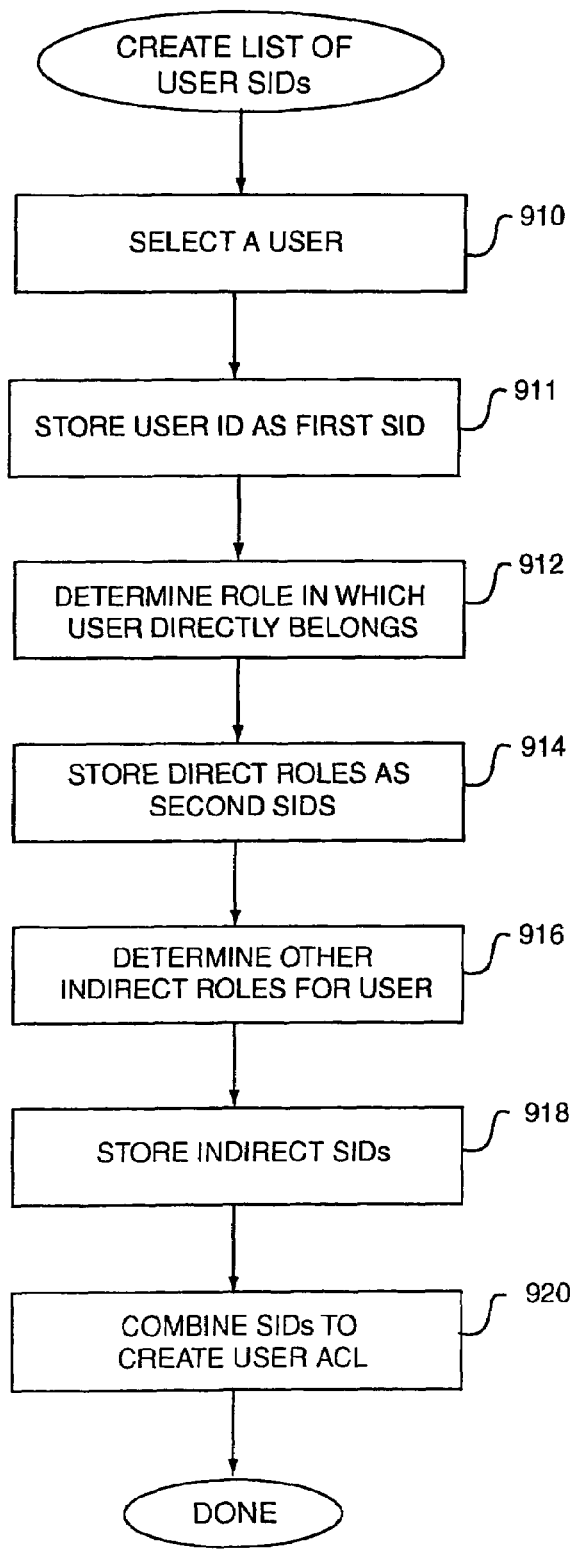

Table of Contents 1202

| Region 1204 | Office 1206 | Sales Representative 1208 | Customer 1210 | Page 1212 |
|---|---|---|---|---|
| 1214 East | | | | 2 |
| | 1218 New York | S123 | ABC Co. | 2 |
| | | | XYZ Co. | 5 |
| | | | DEF Co. | 8 |
| | | S124 | GH Co. | 13 |
| | | | LM Co. | 18 |
| | 1220 Connecticut | | PQ Co. | 23 |
| | | S125 | ST Co. | 31 |
| | ■ | | UV Co. | 37 |
| | ■ | S126 | | 45 |
| | ■ | ■ | | |
| | | ■ | | |
| 1216 Central | | ■ | | 108 |
| ■ | | | | ■ |
| ■ | | | | ■ |
| ■ | | | | ■ |

FIG. 12A

METHOD AND APPARATUS FOR GENERATING PAGE-LEVEL SECURITY IN A COMPUTER GENERATED REPORT

RELATED APPLICATIONS

This application is a continuation of patent application Ser. No. 09/450,813, Attorney Docket No. ACTUP002, entitled "Method and Apparatus for Generating Page-Level Security in a Computer Generated Report," naming Rogers et al. as inventors, filed on Nov. 29, 1999, now U.S. Pat. No. 6,859,805 which is incorporated herein by reference for all purposes.

BACKGROUND OF THE INVENTION

1. Field of the Invention

The present invention relates to computer implemented systems and methods for creating a security-enhanced report containing information useful to multiple users. More specifically, the invention relates to systems and methods for generating page-level security and related features for such a report and presenting authorized portions of the report to users.

2. Discussion of Related Art

Many enterprises and organizations today often deal with large amounts of data in the form of reports. The number of reports in a particular organization can vary from dozens to thousands of various types and to levels of employees. It is often the case that some employees in an enterprise are authorized to view certain data while other employees, typically those at a higher level, can see more data than those who report to them. Security with respect to which employees are authorized to see certain data has become an increasingly complex task to manage. For example, executive employees can see more types of data items than other employees in the corporation but the rules as to who can see what are constantly changing. This is made more complex by the high employee turnover rate at many large corporations.

Generally, techniques presently in use to address security needs at large organizations involve two ways of dealing with data security and reports. One method widely used can be referred to generally as a code-based method in which the format and contents of the report are essentially determined through a custom-written program in a language such as Cobol or some other language typically used in large data processing environments. A traditional way to implement "page security" with paper reports, for example, is to print one large report. Sections of pages in the report contain visible headers that indicate who receives that section. An employee goes through the report and "bursts" it into separate printed sections. These sections are then sent to the particular users. Historically, it was cheaper to have a person perform the bursting than to have it done by the computer. One advantage of a code-based technique is that there is significant flexibility with respect to formatting and determining what data will be in a particular report. However, such code-based reports require specialized knowledge of the custom-written program in the particular programming language. This lack of flexibility with respect to making updates and general maintenance of the program is a significant constraint.

Another technique used to generate reports having security features can be referred to as the user-interface (UI) driven process. With UI-based report generation, users essentially fill-in blanks on the screen to generate a particular report. The advantage to using a UI-based report generator is that it is generally easy for a user to generate a report. But, to keep the UI easy to use, most tools omit advanced features such as security. The user simply tells the program where certain text or data should be placed or formatted in a particular report. However, the drawbacks are significant in that such UI-based report generators do not have the flexibility or features to allow for different types of reports or different formatting because the user interface itself is preprogrammed.

As stated above, security with respect to which users can see particular portions of data is a particularly complex issue in large companies. In order to address the security issue, in some situations a company would typically run a single printed report and perform the physical bursting of the pages as described above. For example, a company would execute a report executable for the East, West, and Central regions and have different security rules for each report. Such report executables would typically be stored on a report server and would be executed periodically throughout the day. Essentially, different reports and files would be generated and security features would be attached to each one.

In many cases, a significant issue with running multiple reports in a given day is ensuring that the correct data is contained in each report and that the large set of reports are managed properly. It is not unusual for the number of reports to reach the hundreds or thousands in a single day. This can lead to complex maintenance issues and create an error-prone environment. This is especially true if security rules change for any of the reports or if the time a particular report should run has to be changed. In addition, running a large volume of report executables every day also requires high utilization of an organization's computer resources.

Another practice used in implementing security based on what individual users can see is creating "views" of a database by modifying a query with appropriate restrictions on what fields and tables, for example, a user can see. These restrictions are often implemented with specific SQL statements in a data retrieval instruction. A report based on a particular view in which the report only contains data in that view is created. A user's access to a report is then restricted to that view or a subset of that view if more restrictions are in place. Defining views of a large report is one technique used in solving the security issue.

However, there are several drawbacks with using database views for report security. One disadvantage is that the database for which a view is created has to be accessed each time the user tries to view a report. Alternatively, a database subset must be created for each possible secure view of the data (i.e. report) resulting in a proliferation of persistent objects in the system, eventually matching the number of possible reports. Another drawback is that the calculations and formatting instructions for a view (i.e. report) have to be done each time the user views the report and cannot be cached in advance. Yet another disadvantage of using views to create security-enhanced reports is that the user is not able to view control break or summary information from rows that they are not permitted to view on an individual level. For example, a manager should be allowed to see summarized sales figures from other departments while not allowed to see the detailed sales information from those departments. Using views to create reports, the manager is not able to see even the non-restricted summarized sales figures.

Therefore, it would be desirable to minimize computer resource utilization and reduce the complexities of managing report generation by having one large report with enhanced security features. It would be desirable that such a report have different security rules apply to different categories or groups of data printed in the report. It would also be desirable to have the user believe that he or she is receiving an individual, customized report. In other words, it would be desirable that the security and logical "bursting" of the report be transparent to the user.

SUMMARY OF THE INVENTION

According to the present invention, methods, apparatus, and computer program products are disclosed for generating and viewing an electronic report having security features that allow for "virtual bursting" of the report for multiple users. A single report having multiple pages is generated such that each or some of the pages have security tags that are compared to a security identifier list of a particular user that acts as a security clearance for that user. Through this comparison, a subset of pages from the report is formed which makes up a "report" from the user's point of view that contains only data the user is allowed to see.

In one aspect of the present invention, a method for creating a report having security based on content of the data contained in the report is described. A data row from a data source which is to be "printed" or displayed in the report is retrieved. The data source can be a flat file, a relational database, or other data storage component. It is then determined whether data in the data row causes a level or group break in the report. If the data row causes a level break, a new page in the report is created and a new security tag is formed using information about the new level break. A new page will also be created if the maximum amount of data is on a page (i.e., the bottom margin of a page is reached). The new security tag is then associated with the new page on which the data row is displayed or printed. If the data row does not cause a level break, the data is printed on the existing page in the report and nothing is done to the security tag. Subsequent data rows are retrieved and printed on pages having the new security tag until one of the data rows causes a level break in the data. At this stage a new page is formed and another security tag is created in the same manner as the previous one. Through this process data in the report can be presented to users based on the security tags associated with the pages.

In a preferred embodiment a security identifier for each level break is obtained wherein each level break contains the retrieved data row thereby obtaining one or more security identifiers. The security identifiers are then combined thereby creating a security tag. In another embodiment the step of associating the security tag with a new page in the report involves taking a role (e.g., "Eastern Region Sales Manager" or "Vice President of Marketing") as used in an associated security system and associating it with a data row. Security identifiers (e.g., names of level breaks or groups) in the tag are mapped with one or more roles adopted from the security system thereby creating a security tag usable by the security system. This usable security tag is then associated with one or more pages in the report. In another embodiment data is retrieved from a data source wherein data in the data source is sorted based on one or more level breaks wherein a level break is caused by a change in category of data. In yet another embodiment it is determined whether there is a role in the security system that corresponds directly to the user. It is then determined whether there are any secondary roles that correspond indirectly to the user. The roles are then combined to create a list of security identifiers that acts as a security clearance for the user. This security clearance is then compared to the security tag to derive a subset of pages in the report that can be viewed by a user.

In another aspect of the invention, a method of a user viewing a report having page-level security in the form of a security tag associated with pages in the report such that a user can only view certain data is described. A report having multiple pages where each page has a security tag. A list of security identifiers associated with a user is created or obtained. This can be done through access to a security system. This list of security identifiers is then compared with security tags associated with pages in the report. Through this comparison, a subset of pages from the superset of pages is derived such that the subset of pages only contains data that the user is authorized to view. This is done by comparing the list of security identifiers for the user with the security tags of the pages.

In one embodiment the subset of pages is presented as a stand-alone report created for the user and, as such, has renumbered pages in which the first page of the subset is page one and subsequent pages are renumbered consecutively. In another embodiment the security tag includes level-break identifiers that can be mapped to security identifiers in the list of security identifiers associated with the user and derived from a security system. In another embodiment the level break identifiers in the security tags are compared with the identifiers in the list of security identifiers associated with a user. In another embodiment the subset of pages is derived by determining if there is any commonality between the security tag and the list of security identifiers, and including a page in the subset if the security tag and the list of security identifiers pass a threshold level of commonality when compared. In one embodiment the threshold level of commonality is having one term in the security tag and the list of security identifiers in common. In yet another embodiment content information, such as a table of contents for the report having page numbers of sections in the subset of pages is derived. In one embodiment the content information only contains information related to the subset of pages and generally reflects a level break structure of the subset of pages.

BRIEF DESCRIPTION OF THE DRAWINGS

The invention will be better understood by reference to the following description taken in conjunction with the accompanying drawings in which:

FIG. 7 is a flow diagram of a process for creating a security rule for a frame in accordance with one embodiment of the present invention.

FIG. 8 is a flow diagram illustrating a process for viewing a report having page-based security in accordance with one embodiment of the present invention.

FIG. 9A is a diagram depicting a logical arrangement of a typical security system having security identifiers and members.

FIG. 9B is a flow diagram illustrating a process of creating a list of security identifiers for a user acting as a type of security clearance in accordance with one embodiment of the present invention.

FIG. 12A is a logical hierarchy of nodes for implementing a table of content for a report having page-level security in accordance with one embodiment of the present invention.

DETAILED DESCRIPTION

Figure 1:
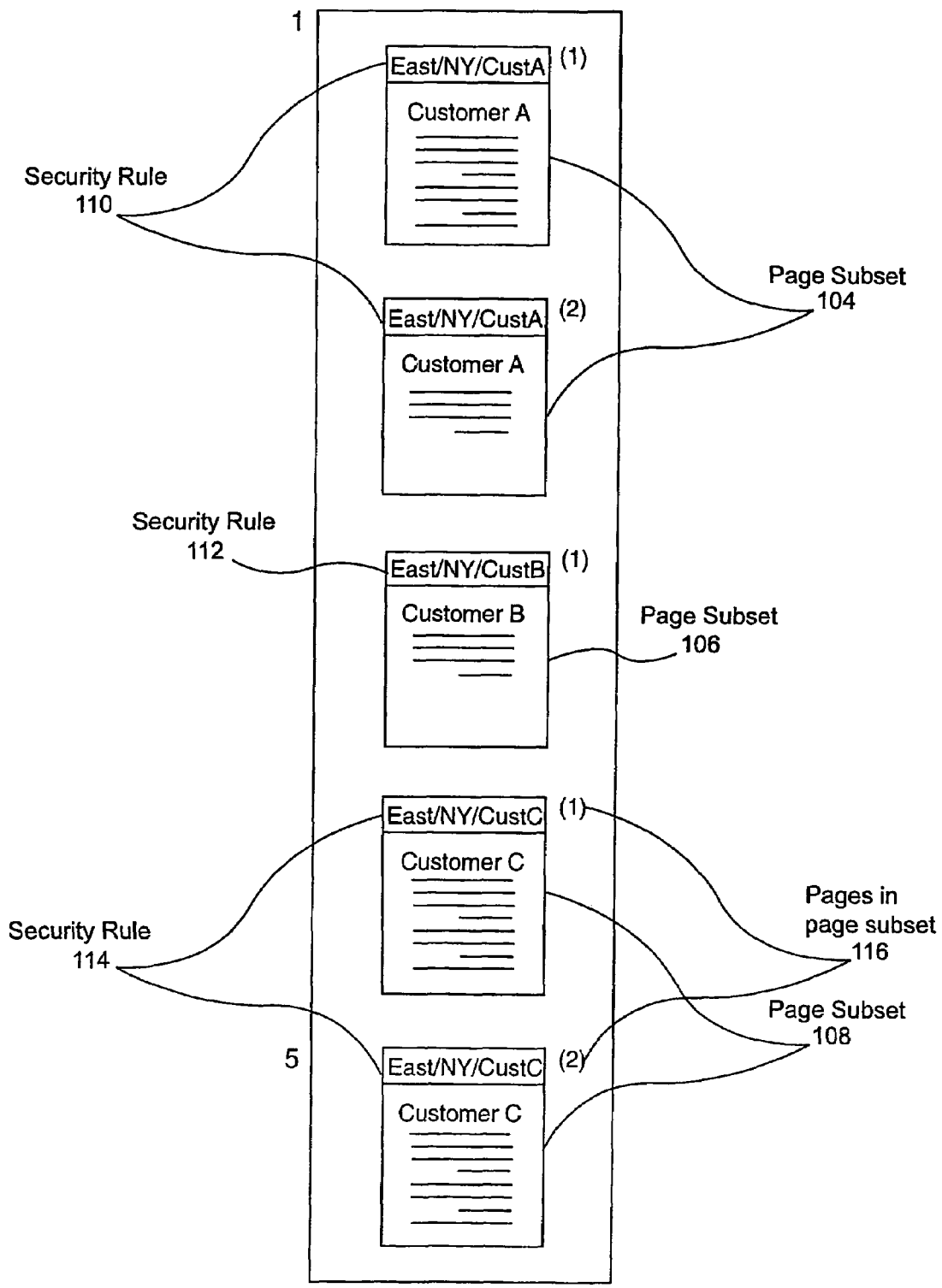
FIG. 1 is a schematic diagram of a single report generated having group-level security manifested in the report at the page level in accordance with one embodiment of the present invention.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

1. Definitions

The following terms are used in the present specification. Their definitions are provided to assist in understanding the preferred embodiments described herein.

A "report" is a highly formatted presentation of data containing data records. Very often, reports are characterized by "level breaks" or group breaks between groups of records provided in the report.

A "report object" is a stored object containing many other objects and logical arrangements of those objects required to display a given report. Thus, a report object may contain objects defining pages, frames, level breaks between records, etc., all for a single report. When the report is to be displayed or otherwise accessed, at least part of the corresponding report object may be loaded into a volatile memory such as RAM for access by a computer CPU.

A "section" is a part of a report containing data having a common feature or purpose. Most reports contain sections separated by level breaks. However, other sections may also be used. These include, for example, sequential or parallel sections containing different types of data. For example, the data for a given customer in a report may be divided into an order section describing orders placed by the customer, a problem section noting any problems that the customer is having, and a potential order section describing potential orders to be placed by the customer.

"Level breaks" are provided at each division among members of a high level group appearing in a report. For example, consider a report listing customers, orders placed by the customers, and items in each order. The report can be structured such that it first displays (beginning at the top of the report) all orders of the first customer. Within the display of each such order, there is displayed the items of the order. Each item may be displayed with information such as a price and/or a part number. After all of the first customer's orders (and all items in those orders) have been displayed sequentially, a second customer is identified with corresponding orders and items also listed. The division between the first customer and the second customer in the report constitutes a "level break." Further, each division between individual orders under a given customer constitutes a (second) level break. Generally, only such "high level" groups have level breaks. The divisions between members of the lowest level groups such as items are not deemed to constitute level breaks.

Level breaks are conveniently used in reports to present "totals" of the information pertaining to a particular high level entity. For example, a first customer level break may provide a total dollar volume of orders placed by that customer. Further under each order by that customer, a separate total number of items and total dollar value can be provided.

A "frame" is a rectangular region of a report that defines a location of a set of data to be displayed in the report. Each frame is also an instance of an object class frame in the report objects of the present invention. Frame objects have such properties as background color, border style, margins, and page breaks, as well as the contents of the frame. The contents include the other frames and controls which appear inside the frame.

2. Description of Preferred Embodiments

In accordance with one embodiment of the present invention, there is provided a method and system for applying page-level security to a report as described in the various figures. To further illustrate the foregoing, FIG. 1 is a schematic diagram of a single report generated having group-level security manifested in the report at the page level in accordance with one embodiment of the present invention. A user views a subset of the complete report that includes only pages that the user is authorized to see. The subset of pages is presented to the user in a manner such that the report appears to be a stand-alone, customized report for that user. The subset of pages is derived by applying a filter operation to the superset of pages (i.e., the complete report). The filter operation can be implemented by comparing security rules for each page against the security "clearance" of a particular user.

FIG. 1 is a block diagram of a single report segmented into groups by level-breaks each having a security rule in accordance with one embodiment of the present invention. A report 102 is a five-page customer sales report and has three groups, one for each customer A, B, and C. Each customer is in New York which is in the Eastern Region. A page subset 104 includes pages of report 102 for customer A. A page subset 106 is for customer B and a page subset 108 is for customer C. Subset 104 has two pages, each one having a security rule 110. In the described embodiment a security rule is a combination of group-level identifiers and is discussed in greater detail below. Security rule 110 is a concatenation of region (East), office (New York), and customer. When a change in content within a report causes a security rule change, a new page is created even if the previous page is not filled. Thus, when security rule 110 changes to a security rule 112 having customer B instead of customer A, the information pertaining to customer B begins on a new page. Similarly, subset 108 is created when security rule 112 changes because of a different customer as indicated by security rule 114. In other examples, level-breaks can occur based on other types of information, such as a change in region or office.

The pages in each subset can be renumbered to begin with one as shown by the parenthetical numerals. For example, subset 108, if displayed by itself would have two pages, as shown by numerals 116. Subsets can be combined to create a report viewable by one user. For example, a sales representative responsible for customers A and C can view subsets 104 and 108. In the described embodiment, these pages are presented to the representative as a four-page report including pages one, two, four, and five of master report 102 renumbered as pages one to four. The creation of the subsets of pages based on page-level security allows users to view pages from a single master report in a manner that makes a subset of pages appear to the user as a single, independently-created report. In other words, a report that was specifically created for him. The processes that allow the creation of the security rules, report pagination, page filtering (to create the page subsets), page renumbering, and other features are described in greater detail below. First, a logical hierarchy of components and objects that make up a report (without reference to the security features described above) is described. These objects are used throughout the remaining discussion of the page-based security and related features of the present invention.

Figure 2:
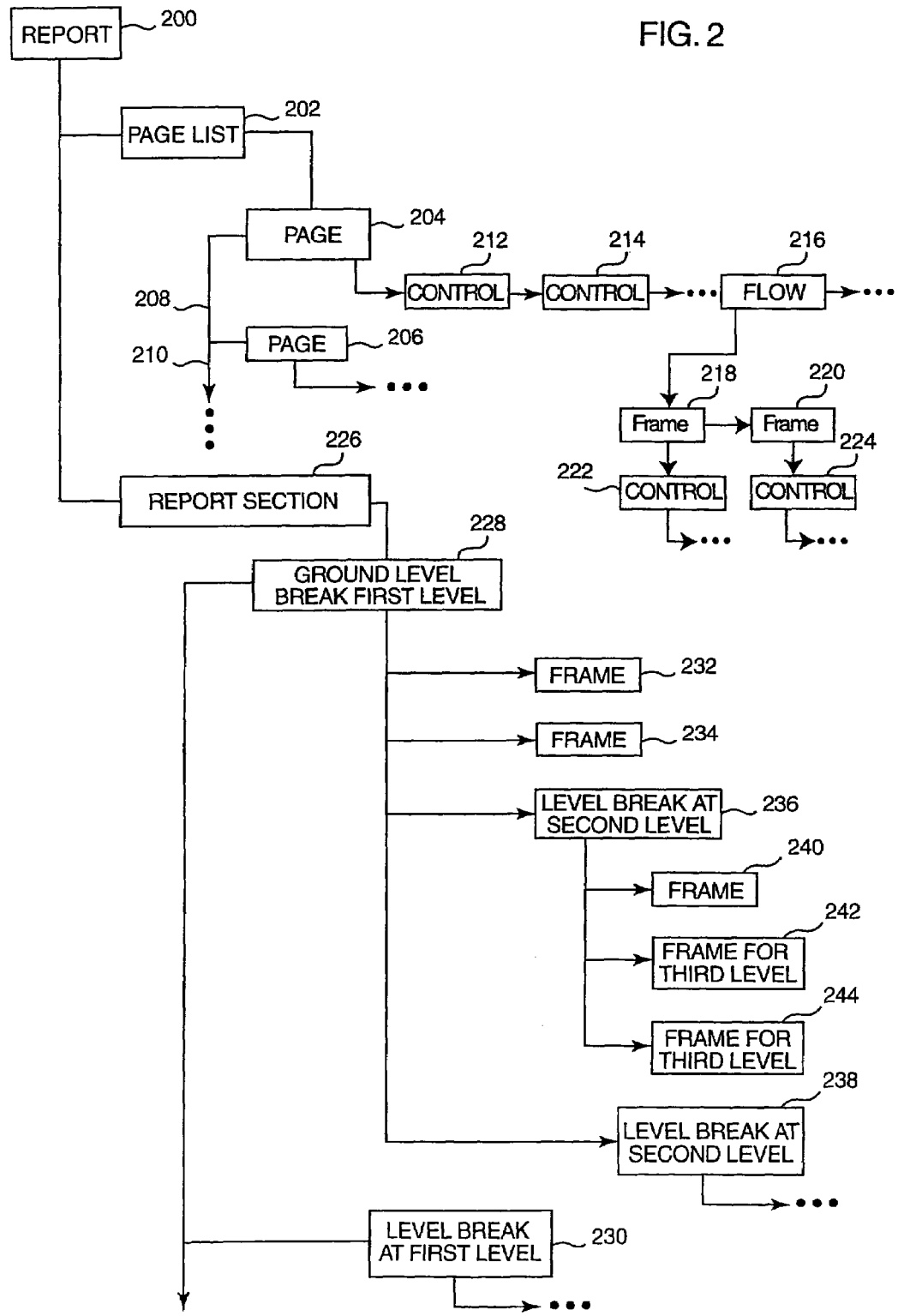
FIG. 2 is a schematic diagram of a logical hierarchy of a report object in accordance with one embodiment of the present invention.

FIG. 2 is a schematic diagram of a logical hierarchy of an exemplary report object in accordance with one embodiment of the present invention. As shown, a Report object 200 has a page list hierarchy and a group or level break hierarchy. A page list hierarchy 202 includes at the highest level, a series of page objects or instances 204, 206, . . . , each representing a separate page of the final report. Each such page object provides the backdrop or boundary for laying out flows of data that will appear on a given page of the report (e.g., on an 8½×11 inch sheet of paper). As shown, page objects 204, 206, . . . sequentially reference one another as indicated by lines 208 and 210. In another preferred embodiment, each individual page object references a header for the next sequential page. In the described embodiment, contents of the page hierarchy are connected to one another in a linked list. It should be noted that all the lines shown in FIG. 2 connecting the various objects and components are bi-directional and it should be understood that the structure can be navigated in the direction shown by the arrows as well as in the reverse direction.

Each page object also references objects for all the information contained in that page (both displayed information and other logical hidden information). In page list hierarchy 202 the next lower level below the a page object references a series of controls 212, 214 . . . and flows 216 . . . . As mentioned above, each control contains information for some feature displayed on the page. Examples of page controls include headers such as titles, footers, page numbers, footnotes, etc. Also as noted above, each flow such as flow 216, defines the portion of a page where actual data for the report (e.g., data from a database) is presented. Thus, data is, in essence, "flowed" into the report into the flow regions defined within the page by flow objects.

Each flow, in turn, may reference one or more frames. Flow 216 is shown referencing frame objects 218 and 220. As noted, a frame represents a rectangular region for displaying report data within a given flow on a page. Like the pages themselves, the frames may reference one or more controls. Examples of controls on frames include headings, blank space, and totals at the end of a level break. Frame object 218 includes controls 222, . . . , and frame object 220 includes controls 224 . . . . It is important to note that the same frame appears in both the page list hierarchy and in a section hierarchy described below. In the described embodiment, this is one of the features that enables page-level security of the present invention.

A report section hierarchy 226 includes a group or level break logical arrangement of report objects. As displayed, level break objects 228 and 230 (e.g. group breaks between customers A and B, and between customers B and C) at a first level are presented at the next level of the hierarchy, and are sequentially linked to one another. Moving down the hierarchy, one or more frames such as frames 232 and 234 are logically contained within, and present titles and totals for, level break object 142. In addition, one or more level breaks at a second level such as objects 236 and 238 represent level breaks within the higher level break. Similar branching would be provided for level break object 230 and others at the first level.

Moving further down the hierarchy, each level break object at the second level (objects 236, 238, . . . ) may reference one or more frames 240, 242, and 244, some of which contain information at the third level (frames 242 and 244). Thus, for example, level break object 236 includes frame objects 240, 242, and 244, of which third level data is provided with frames 242 and 244. These third level frame objects (a rectangular region) contain the individual pieces of report information provided at the third level (e.g. items of an order). It should be understood that level breaks are defined between only those entities which are not at the lowest level of the hierarchy. Thus, no level breaks are defined between instances or frames of the third level objects. As noted above, the same frame is shared between the page list hierarchy and the section hierarchy.

It should be recognized that other forms of section breaks, besides level breaks, may be employed in the report objects of this invention. For example, the report may be broken into sections that contain different types of information separated by breaks. As an example, the breaks may divide data pertaining to a particular customer into actual orders placed, potential orders to be placed, and problems that the customer has observed. The breaks between these three types of data do not qualify as level breaks as defined above. Nevertheless, the present invention pertains to reports having such section breaks whether used alone or in combination with level breaks.

In the described embodiment the two hierarchies discussed above can be described as representing subtrees in which the frames represent leaves of each subtree. The notable point here is that each frame is a leaf in both the subtrees. As noted above, the structures can be navigated through line 246 between page list 202 and a frame object. This allows the report generation program and viewer tool to apply security data from groups to individual pages. Recall that data frames can contain specific data items. For example, an employee data frame from an employee database can contain the first and last names of the employee, the employee's age and years on the job.

Figure 3:
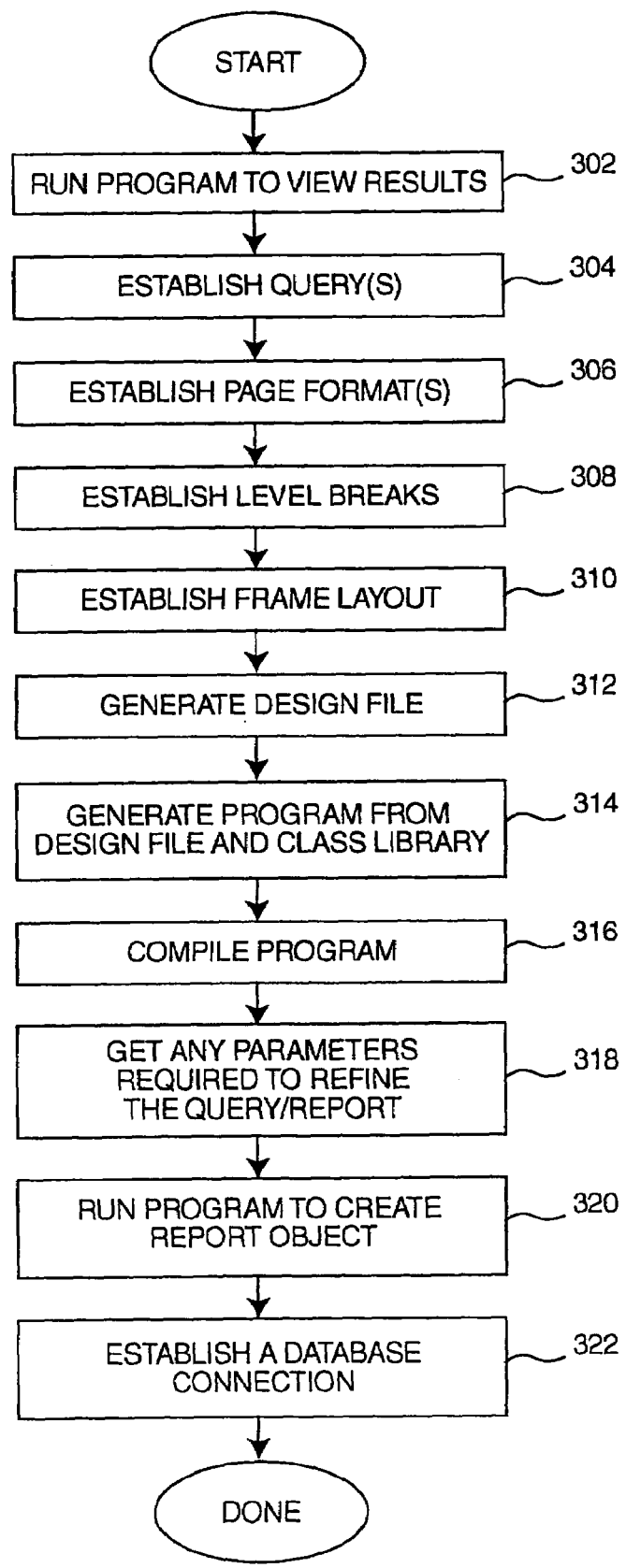
FIG. 3 is a flow diagram of a general methodology for designing, programming or building a report design in accordance with one embodiment of the present invention.

FIG. 3 is a flow diagram of a general methodology for designing, programming or building a report design in accordance with one embodiment of the present invention. First, a connection class is established at a step 302. That is, an object class is created, which references the necessary information to connect to a source of data such as a database. After the connection class has been established, the system establishes a query data source at a step 304. The query data source is used to retrieve data from a database or other data source.

Thereafter, the system establishes a page format for the report at a process step 306. Next, in process step 308 and 310, the system establishes level breaks between appropriate categories of information presented in the report and also establishes a frame layout within each level break. It should be understood that each of steps 302, 304, 306, 308, and 310 are preferably initiated by a user interacting with a graphical user interface on a computer monitor. Specifically, the user specifies a connection class, a query, a page format, level breaks, etc. by conventional graphical techniques such as selecting objects from a palette, defining rectangular display regions on a page with the aid of a pointing device, and "dragging and dropping" information into specific parts of the report. The exact nature of the graphical user interface is not critical to this invention, and those of skill in the art will understand that many variations on this theme are possible.

As the user is performing these steps, the computer system is beginning to establish an internal representation of the report object design as specified by the user at steps 302 to 310. It should also be understood that the sequence of these steps may be altered, and ultimately depends upon how the user goes about setting up the report design. When the user has completed the design, the system has completed generation of a design file as indicated by a step 312.

After generation of the design file is complete, the computer system generates a source code file or program from the design file and an object class library provided in the software. In preferred embodiments, the generated program is written in some form of object-oriented language such as Visual Basic or C++. Whatever language is chosen, the program's purpose is to generate a report object executable. After the program has been generated, it is compiled at a step 316 and any other parameters required to refine the report object executable are obtained at a step 318.

At a step 320, the report object executable is used as input to a "factory," along with the appropriate class libraries, to create the desired report object. This report object is then used as input to a viewer tool, described in greater detail below, which allows a user to view the report. Also input to the view tool is the report object executable. Through step 320, a visual representation of the report is displayed with all information shown on pages in the logical arrangement specified by the user/designer at steps 302 to 310.

Figures 4A, 4B:
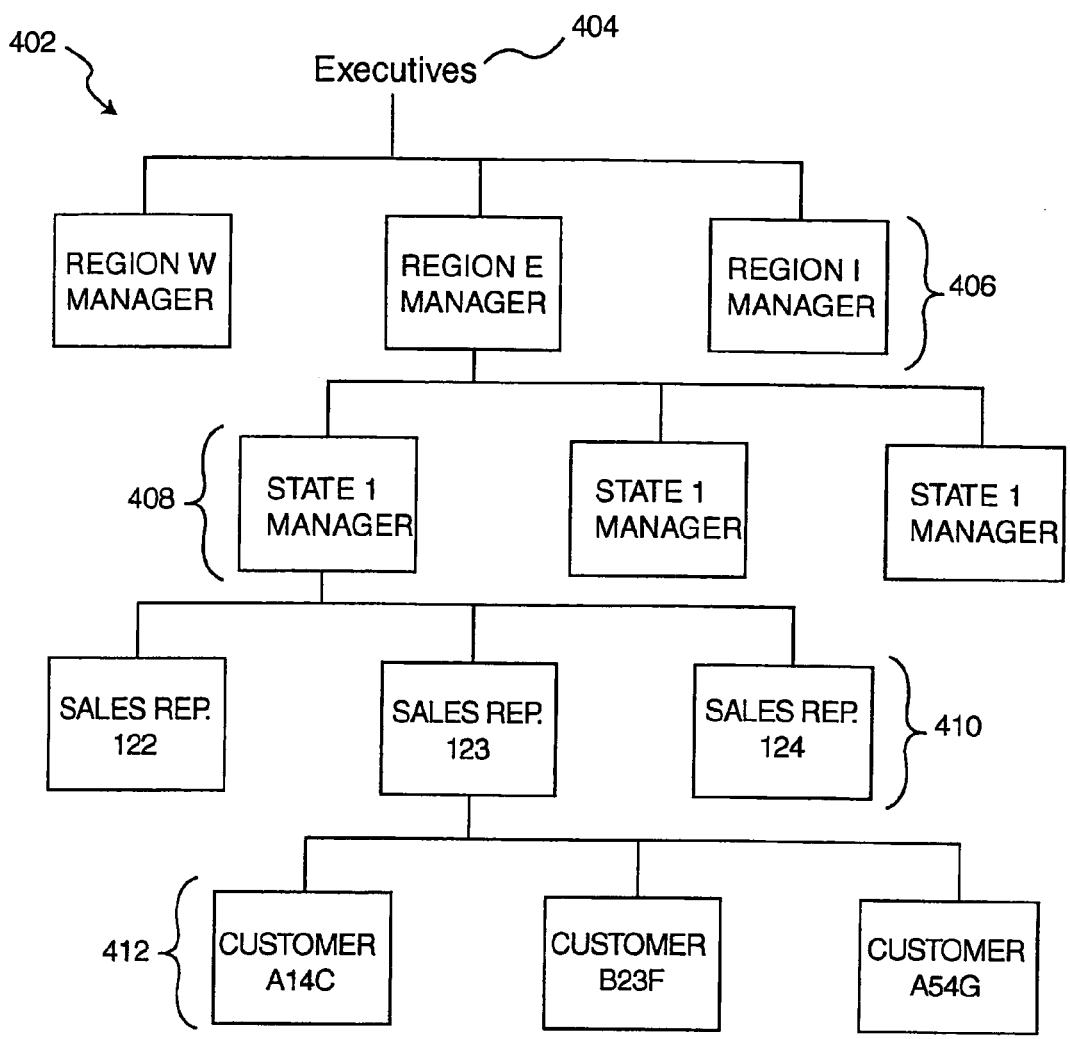
FIG. 4A is a corporate organizational chart illustrating examples of different levels in a sales organization which can correspond to level-breaks in a report.
FIG. 4B is a data structure representation of sorted data residing in a database or file system.

FIG. 4A is a corporate organizational chart illustrating examples of different levels in a sales organization which can correspond to different levels of access in a report. Organizational chart 402 has several layers. At a top level 404 are executives, followed by a regional manager level 406. Under level 406 is an office level 408 followed by a sales representative level 410. At the bottom level of organizational chart 402 is a customer level 412. For the purpose of illustrating concepts below, the names and labels used in chart 402 are the same ones used to represent the data in a database that stores the information. As will be described below, these names, for example "Region E Mngr," "S.R. 123," and "CustomerB23F" may be matched with corresponding names used in a security system, which may not use the same names as those in the database. That is, S.R. 123 may be represented as FJones or CustomerB23F may be Apex Corporation, and so on, in the security system. It is also useful to note that the different levels can correspond to level-breaks of how the data is sorted in the database. This is briefly illustrated in FIG. 4B.

FIG. 4B is a data structure representation of sorted data residing in a database or file system. A data record 414 has a number of fields. Shown are a Region field 416, an Office field 418, a Sales Representative field 420, and a Customer field 422. A first level break occurs when there is a change in Region field 416, a second level break occurs when there is a change in Office field 418, and a third-level break when the Sales Rep field 420 occurs. Shown are several customers for sales representative S.R. 123. This data reflects the data illustrated in organizational chart 402. A third-level break occurs when all the customers for S.R. 123 have been listed, and data for the next sales representative is provided. Similarly, when data for all the sales representatives for the State1 Mngr office has been listed, a second-level break occurs and data for another office, such as State2 Mngr, is listed. This is done for all the offices in the Eastern region. Once the Eastern region is complete, a first-level break occurs and data for another region is listed. This is one example of how data, eventually displayed in a report, can be organized or sorted. Typically, this is done by a database administrator and, at an abstract level, is normally how data is stored in an organization's databases, regardless of what type of report security or other features are used. That is, most entities organize their data in some type of logical, hierarchical manner, such as that shown in FIG. 4B. The database designers and users of the data normally determine where the level-breaks should occur, and that usually depends on how the data is used. As stated above, in some preferred embodiments, the level-breaks are used to determine when data of a new group (e.g., a different sales rep or a different office) should be displayed or contained (printed) on a new page and what the security rule for that new page will be. In other preferred embodiments, groups and section breaks can also be used to determine when data should be displayed on a new page. In yet other preferred embodiments, security breaks in data can be based on other criteria as determined by the specific needs and characteristics of an organization. A new ACL can be created based on any section. For example, it is possible to have different security needs for different parts of data for the same customer (represented by a "sequential section"). For example, employees in the Customer Support group can only see Customer Problem data, the Finance group can only see sales forecast data for the customer, Production is only allowed to see data related to committed orders, and the Sales Representative is allowed to see all data for the customer.

Figure 5:
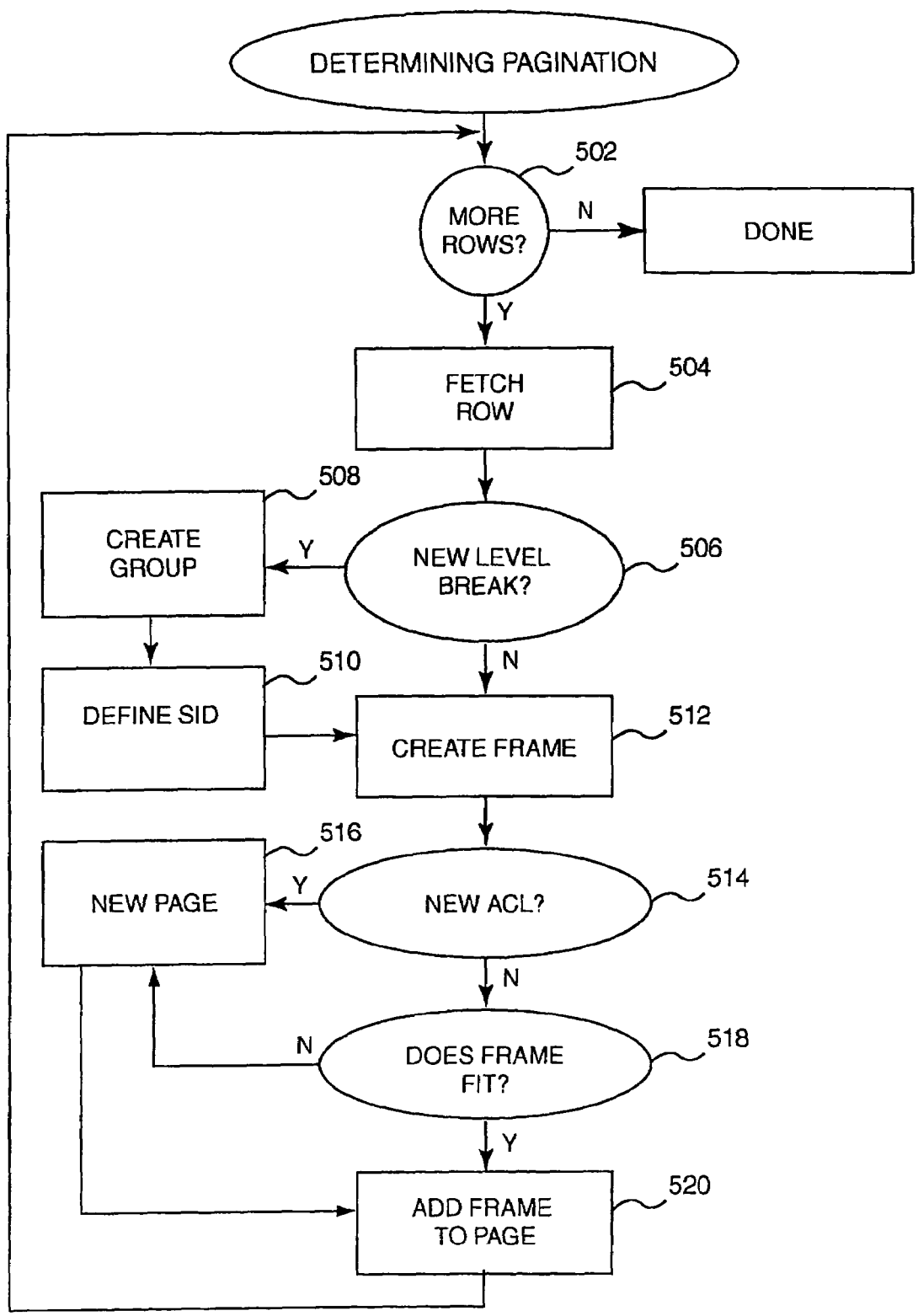
FIG. 5 is a flow diagram illustrating a process of determining when a new page should be created in accordance with one embodiment of the present invention.

FIG. 5 is a flow diagram illustrating a process of determining when a new page should be created in accordance with one embodiment of the present invention. As described below, report pagination can be based on at least two criteria: a change in security rule and report page size. In the described embodiment, if a new group of information is created, such as data for a different customer or data for a different region, a new security rule can be created. If a new security rule is created, data associated with that security rule is flowed onto a new page, even if there is space for further information on that page. This process is described below. At a step 502 a report generation program checks whether there are more data rows returned from the query (described in step 304 of FIG. 3) to be printed in the report. If there are none, a complete report has been generated and the process is complete. If there are more data rows, a data row is retrieved from the report object at a step 504. Typically, a "data row" contains data that would be "flowed" onto a single line of a report. However, the security feature of the present invention need not be limited to processing a single data row at a time. In some embodiments, multiple data rows can be processed simultaneously for the purpose of applying security criteria. In other embodiments, portions or specific fields of a data row can be examined separately for possibly applying different security criteria to a single data row when different data items in the row may require different security levels.

The data row is examined at a step 506 to determine whether a new level break is required in the report based on the type of data contained in the data row. A new level or group break is needed when the nature of data retrieved changes. For example, if the data is for a different customer, product, or region, typically a level break occurs, often accompanied by a "total" or other cumulative data associated with the previous category of data. When a new level break is needed, a group is created accordingly, such as for a new customer or region, at a step 508. In the described embodiment, a new group has a corresponding security identifier or SID. A SID is created for the new group at a step 510. In the described embodiment the SID can be any type of unique identifier, for example "EastRegionMgr" or "customer254" or any other alphanumeric string. Once a SID is created or defined for the new group, a frame, into which the data row is "flowed," is created at a step 512. The newly created frame has an associated security rule, referred to as an access control list or ACL, made up of concatenated SIDs. Thus, the ACL for the newly created frame may be different from the ACL of the previous frame depending on whether a new group was created. Returning to step 506, if a new level break is not needed, control also goes to step 512. In this case the new frame does not have a new ACL because a new group and, thus, a new SID, was not formed.

At a step 514 the report generation program determines whether the newly created frame has security rule or ACL different from the immediately preceding frame's security rule. If the frame has a different ACL from the previous ACL, a new page in the report is created at a step 516. As described above, a new page is forced at this stage because a new security rule is being applied. This implies that a set of users different from the previous set of users who were allowed to view pages having the previous security rule will now be able to view subsequent pages with the new security rule. If the ACL has not changed control goes to a step 518 where the program determines whether the new frame fits in the current page based on format settings for the current report page. If the data frame does not "physically" fit on the existing report page, control goes to step 516 and a new page is created. Control then goes to a step 520 where the frame is added to the a page, in this case a new page. If the frame does fit, control also goes to step 520 where it is added to a page, in this case an existing page. After step 520, the report generation program returns to step 502 to check for more data rows from the query. It is through the above described process that a security rule is applied to a page in a report based on group level changes in data being placed on that page.

Figure 6:
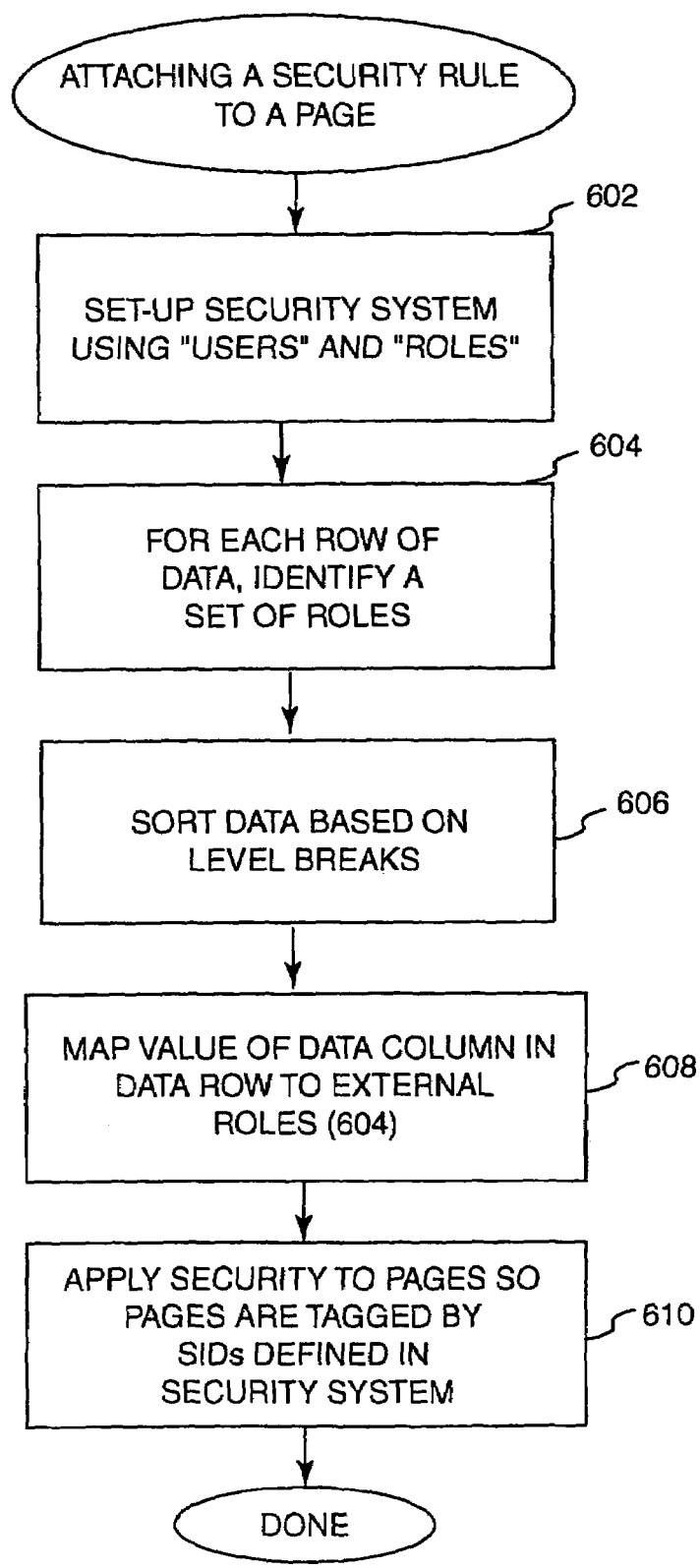
FIG. 6 is a flow diagram illustrating a process for attaching a security rule to a frame in accordance with one embodiment of the present invention.

FIG. 6 is a flow diagram illustrating a process for attaching a security rule to a frame in accordance with one embodiment of the present invention. As first described in step 512 of FIG. 5, when a frame is created, it has a corresponding ACL attached to it. An ACL is made up of a series of SIDs which can change when a new data group is created. At a step 602 a network security administrator at the company or organization creating the report sets up a security system if one has not already been created. Typically, most organizations concerned about data security already have an existing security system. In the described embodiment, a security system is set up in terms of "users" and "roles." In some similar security systems, "roles" are referred to as "groups." A particular user can be included in one or more roles and roles can be subsumed in other "higher" roles. For example, a user "FJones," a sales representative in the New York office can have one role as "NY Office." Another user "JSmith," a sales representative and manager of the New York office can have two roles in "NY Office" and "NY Office Mngr." This type of security system is described in greater detail below. At a step 604 one or more SIDs per group are identified for each data row retrieved from the report object as first described in step 504 of FIG. 5. The set of roles assigned to data in a data row (which may have data items with varying security needs) determines the security level of the page containing that data row and others on the page.

At a step 606 data in the database used in the report is sorted based on level breaks or groups as described initially in step 506 to 512 of FIG. 5. Sorting the data in such a manner is typically done in any case and is normally performed by the report. Data in reports is typically sorted according to level breaks, often because it is useful to have sums or totals of a particular data item at such breaks (e.g., total dollar sum of purchases by a customer, total sales for a region, etc.). At a step 608 the report generation program performs an external mapping of values of data columns in a data row to the external roles identified in step 604. This external mapping process is described in greater detail below. It is typically needed because names of data items, such as State 1 Mngr or Sales Rep. 123, used in the database are typically not the same as the names used for the same data items in the security system. Thus, in order for the different encodings applied to the same data items to work together to provide group-level security, some type of mapping of the different encodings is needed. After database encodings are mapped to corresponding security system encodings, security rules can be applied to pages in the report. At a step 610 a security rule having encodings used by the security system is tagged or applied to a page in the report so that the security system can read and interpret the security rule. The process of attaching a security rule to a page is the same as the process described above. The only difference is that the contents of the SIDs have been "translated" for the security system. At this stage the process of attaching a security rule to a page is complete.

FIG. 7 is a flow diagram of a process for creating a security rule for a page in accordance with one embodiment of the present invention. As mentioned above, a security rule, implemented as an ACL in the described embodiment, is associated with a page in the report and is a concatenation of SIDs, where each SID corresponds to a group level break in the data. In other preferred embodiments, this mechanism for applying security to a page can also be applied at any level. For example, it is possible to apply security down to individual fields within a page. In this case, rules for determining which whole pages are visible are first determined. Once this is done, the same security rules are applied to see which fields are visible. For example, an employee report may have the following rules: 1) all managers can see all pages which include fields or columns for employee name and date of hire; and 2) only the manager directly responsible for an employee can see a third field containing employee salary. This can be referred to as object-level security and is another application of the security mechanism of the present invention.

At a step 702, for each group in which the retrieved frame is a member, the report generation program retrieves a SID. In the described embodiment, there are at least three ways to retrieve a SID: 1) derive it directly from a column in the data row; 2) compute it from the data in the data row; and 3) use a column from the data row as a key into a lookup table to obtain the SID. In one example of obtaining SIDs, if a data row is embedded within four groups or level-break objects (e.g., region, office, sales representative, and customer), four security identifiers are retrieved. At a step 704 the SIDs are concatenated to create an ACL. An example of an ACL is "NYMgr, Office123Mgr, Rep1234" where the first SID is for the manager of the state, the second is for the office manager, and the third for the sales representative. These ACLs are used to determine when a new page should be created in a report as described in FIG. 5. At a step 706 the newly created ACL is associated with a particular frame which, in turn, is placed in a page in the report. Each frame displays data for a particular row. Thus, once the ACL for a row is determined, the ACL for the corresponding frame is known. In the described embodiment, the ACL for all appropriate frames on that page can be described as an invisible property or attribute of that page. At this stage the process of creating a security rule for a page is complete.

FIG. 8 is a flow diagram illustrating a process for viewing a report having page-based security in accordance with one embodiment of the present invention. At a step 802 the user logs in by entering a user identifier and the user's roles, if any. As part of this step, the viewer program first ensures that the user is authorized to access the report object before it is retrieved. At a step 804 a report having pages with tagged ACLs is retrieved. At this step the viewer program obtains a list of user SIDs. This list of SIDs can include the user ID and any other roles or aliases that the security administrator has assigned to the user. As there is an ACL or security rule for pages in a report, there is a similar construct for an individual user. This user ACL is made up of the user identifier (obtained at login) and roles, if any. In the described embodiment the user SIDs can be changed dynamically. The user roles are obtained by the viewer program from the security system. The security system retrieves the roles associated with the user when the user logs in.

At a step 806 a subset of pages is derived by applying a type of filter by performing a set operation to determine which pages from the report the user is authorized to view. In the described embodiment this is done for ranges of pages using a b-tree representation of a map from SIDs to visible page ranges. Logically, for every page, a set operation is performed: the intersection of the ACL for a page (recall that this is a list or concatenation of SIDs) and the list of SIDs for the user (i.e., the user ACL) is determined. If the intersection set is not null, the user is allowed to view the page. That is, if there is at least one SID in common between the ACL for the page and the list of SIDs for the user, the user is allowed to view the page. This filter operation is applied to every page in the report. A subset of pages that pass the filter operation is created. The number of pages a particular user is authorized to view can vary widely from 3 or 4 pages out of a thousand page report for a entry-level sales representative to nearly all the pages for a regional executive, for example.

In the described embodiment, the comparison of the two ACLs is performed using a b-tree and standard techniques for building and searching b-trees. In one b-tree configuration, each security identifier that can be found in either a user ACL or a page ACL is a leaf node in the tree. Associated with each leaf node is one or more page ranges that have an ACL that contains the security identifier. When a new security identifier is encountered, a new node is created by marking the end of one page range in an existing node and creating the beginning of new page range for the new node. With this configuration, efficient searches for security identifiers and page ranges can be performed using standard b-tree searching techniques. In other preferred embodiments, other data structures or alternative b-tree configurations can be used to perform the ACL matching process.

At a step 808 the viewer program allows the user to view and perform view operations on the subset of pages created in step 806. In the described embodiment the subset of pages is renumbered with the first page of the subset as page one. The subset of pages can be simply a contiguous block of pages or a series of non-contiguous individual pages or blocks of pages. The page renumbering operation is described in greater detail below. At this stage the process for viewing the report is complete.

FIG. 9A is a diagram depicting a logical arrangement of a typical security system having security identifiers and members. In a security identifier (SID) column 902 are listed various users and roles in an organization. The roles correspond to specific positions, as opposed to specific individuals, in a company. The users correspond to specific employees or users in an organization. For example, Role 1 may be Sales Representative 124 or another role may be New York Office Manager or Eastern Region Manager. By having roles correspond to positions instead of individuals, movement of individual employees does not require significant changes in the security system. If an individual moves he or she is simply assigned a new role. Essentially, the roles in such a security system correspond to a particular security level of which there may be many gradations. It is important to note here that the names given to the roles in the security system, such as New York Office Manager or Sales Representative 124, are likely not the same as the names used in the data source for the same position. For example, the label "State 1 Manager" may correspond to the same position as "New York Office Manager." In the described embodiment roles can be added to the security system dynamically, such as when a new manager position, an additional sales representative position, or any other position having a security "level" is created.

A corresponding Members column 904 has numerous entries, each entry corresponding to a role or user in security identifier column 902. An entry, such as entry 906, contains one or more roles but not users since a role does not obtain security rules from users that belong to that role. Members column 904 contains users and roles that are "members" of a particular role listed in security identifier column 902. A particular user, identified by a user identifier, who is the Eastern Region manager would be a member of the role corresponding to Eastern Region manager. Roles can also be members of another role. For example, the role for Eastern Region manager, such as Role 4, is also a member of the role for New York Office manager since the Eastern Region manager can see all the data the New York Office manager can see. Similarly, the role for New York Office manager, say Role 2, is a member of Role 1 which may be the role for a sales representative in the New York Office. A process of deriving an ACL for a particular user identifier using the security system of FIG. 9A is described in FIG. 9B.

FIG. 9B is a flow diagram illustrating a process of creating a list of security identifiers for a user acting as a type of security clearance in accordance with one embodiment of the present invention. At a step 910 a user wanting to access a report logs on to a report viewing tool. By logging on the user provides the system with a user identifier such as a login name. At a step 911 the user identifier (user ID) is stored and used as the first SID in creating the user ACL. At a step 912 the report generation program searches the "Belongs To" column 904 to determine roles to which the user directly belongs. For example, if the user ID is UserID5, a corresponding role can be Role 4. At a step 914 the direct roles are stored as secondary SIDs in the user's SID list. This process of determining whether a role corresponds to any other indirect roles is a technique commonly performed in many existing security systems which may use the term "group" or similar term for role.

At step 916 the system determines any indirect roles to which the user may belong. These are roles that correspond to the user's direct role and any subsequent indirect roles. These indirect roles typically arise when a user, such as FJones, is a manager of one or more levels of employees below him. Using the same example, the system will search column 902 to find roles to which FJones belongs. The system will first find that Role 4 is a member corresponding to Role 2, which implies that FJones is an indirect member of Role 2, which may be the New York Office Manager. This implies that because FJones is an Eastern Region Manager, he is allowed to view all the data the New York Office Manager is allowed to view. The system repeats the search to find roles to which Role 2 belongs. It will find Roles 3 and 4. Repeating the search with Roles 3 and 4, it will find no other roles. It is possible that a role such as Role 4 will be a member in numerous roles, such as the Connecticut Office Manager and other state office manager roles in the Eastern Region.

Once this process is complete, all the indirect roles are stored as additional SIDs at a step 918. In some cases there may not be any indirect roles. This would be the case if the user is a sales representative and was not allowed to view any data other than his own customers' data (i.e., his role is not a member of any other roles in the security system). At a step 920, the SIDs stored at step 914 and step 918, if any, are combined to form a security list for the user. User FJones, for example, would have a security list resembling "FJones, Eastern Region Manager, New York Office Manager." FJones would not inherit security rules for an individual user. He would be allowed to see data for Sales Representative124 because the report has granted permission to the New York Office Manager for Rep 124's data. In the described embodiment, he would have a security list that contains other states and sales representatives. This security list contains all relevant roles for the user. Once this is done the user has a security list which, typically after a translation process, can be used by the report generation program in a comparison operation to create subsets of pages that the user can view.

Figure 10:
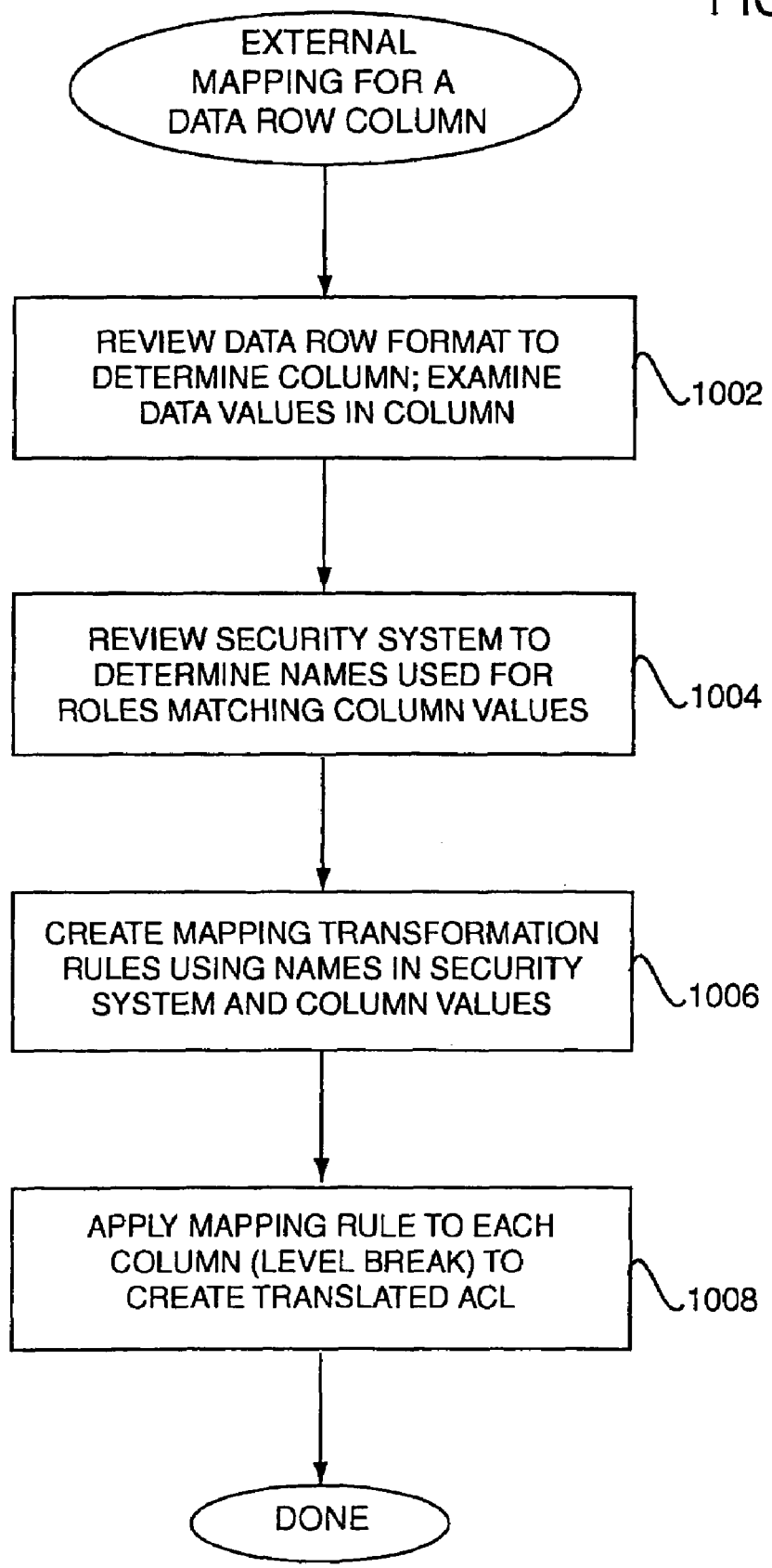
FIG. 10 is a flow diagram illustrating a process for externally mapping names used in the security system with names used in the database or data source in accordance with one embodiment of the present invention.

FIG. 10 is a flow diagram illustrating a process for externally mapping names used in the security system with names used in the database or data source in accordance with one embodiment of the present invention. The steps depicted in FIG. 10 are a combination of design time tasks and steps taken at runtime or when the report generation program is executing. At a step 1002, the format of a data row extracted from the data source is examined. This is done to determine what the SID will be for a particular data column in the data row. For example, if the mapping is for the manager field, the column corresponding to a manager identifier in the data row is selected. For example, if the names for office managers in the database, such as "State 1 Manager" or "State 2 Manager" as shown in FIG. 4A, are different from those used in the security system, such as New York Office Manager, an external mapping needs to be done. One of the design steps in the mapping process is identifying the column name in the data row that corresponds to a manager identifier, or other columns corresponding to customer or region.

At a step 1004 security system roles or SIDs are reviewed to determine which roles in column 902 of FIG. 9A in the security system correspond to office managers, such as New York Office Manager or Connecticut Office Manager. The security system can be an internal component in the report generation system or can be an external security system implemented in various ways such through a database or an LDAP server, or can be a security system in an existing operating system such as Unix or Windows NT. Once all the roles that correspond to the office managers in the security system are identified, at a step 1006 mapping rules are prepared that will translate names and codes in the database to appropriate names in the security system. The complexity of this step can range from a few simple translation rules or mappings for small organizations to highly intricate mapping codes and look-up tables for larger organizations with many levels of management and numerous manager positions at each level. It can be made more difficult if there is no apparent connection or resemblance between the names used in the database and the security system. In the example above, step 1006 might involve writing routines accessing another table in the database or a separate look-up table to translate "New York Office Manager" to "State 1 Office Manager" and the like.

At a step 1008 the mapping rules or functions are applied to each data row. Once this is performed for data rows in each level break or role change, a complete ACL defined in terms used in the database is created and can be used to determine user access to a particular page. This step is also described in step 704 of FIG. 7 which discusses concatenating the SIDs to create a security rule. As described above, once the list of security identifiers making up a user ACL is transformed to a string of identifiers used in the database or, more specifically, terms used in the ACLs for pages in the report, the filtering operation can be performed. In the described embodiment, step 1008 is performed at runtime or at the time the user is attempting to access the report. This is the last step necessary for the mapping process for a single level break. These steps are repeated for each level break in the data. For example, after the office manager field is done, the process can be repeated for region, customer, and other fields that cause level breaks in the data. Once the data field values are mapped to roles in the security system the comparison operation described above can be performed to create a subset of pages from the report.

Figure 11A:
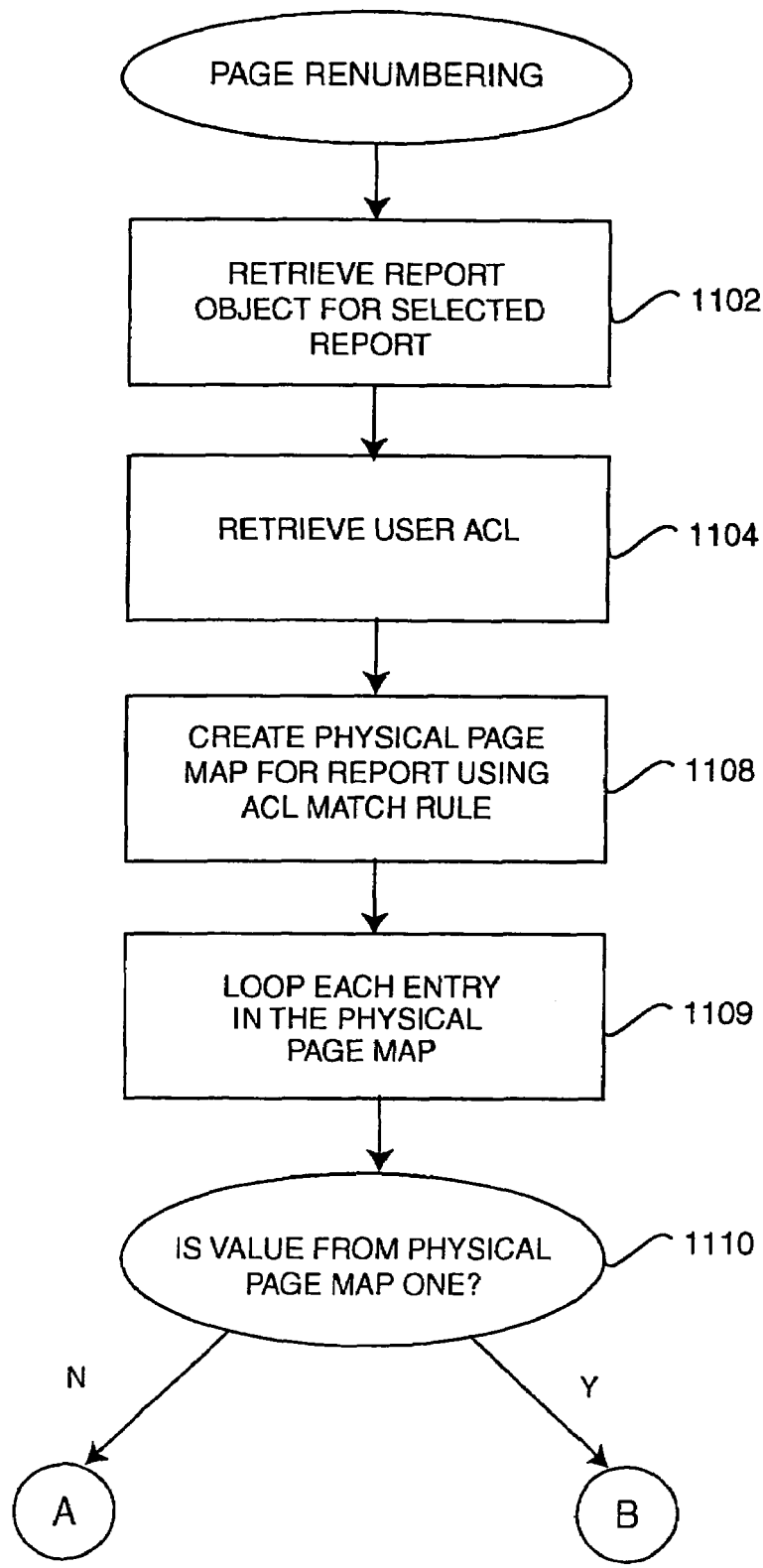
FIGS. 11A and 11B are flow diagrams illustrating a process for renumbering pages in an individual report in accordance with one embodiment of the present invention.

Another feature of a report having page-level security of the present invention is the renumbering of pages of the subset of pages available for viewing to a particular user. The renumbering of pages so that the first page of the report viewed by the user is page one is necessary if the user is to believe that the report was customized and created specifically for that user. In some contexts this may not be necessary; that is, the user is not concerned whether the report is from a larger report. In this case page renumbering may not be required. FIG. 11A is a flow diagram of a process for renumbering pages in a report in accordance with one embodiment of the present invention. Page renumbering is initiated by the viewer program after a user logs in, gets a user ACL (i.e. list of security identifiers), and selects the option of viewing a report. Once this option is selected, data structures are created and populated with relevant data necessary in the described embodiment for the page renumbering operation. At a step 1102 a report object instance for the report the user wants to view is retrieved by the viewer program. At a step 1104 the user ACL is retrieved. A process for creating a user ACL is described in FIG. 9B above.

Figure 11B:
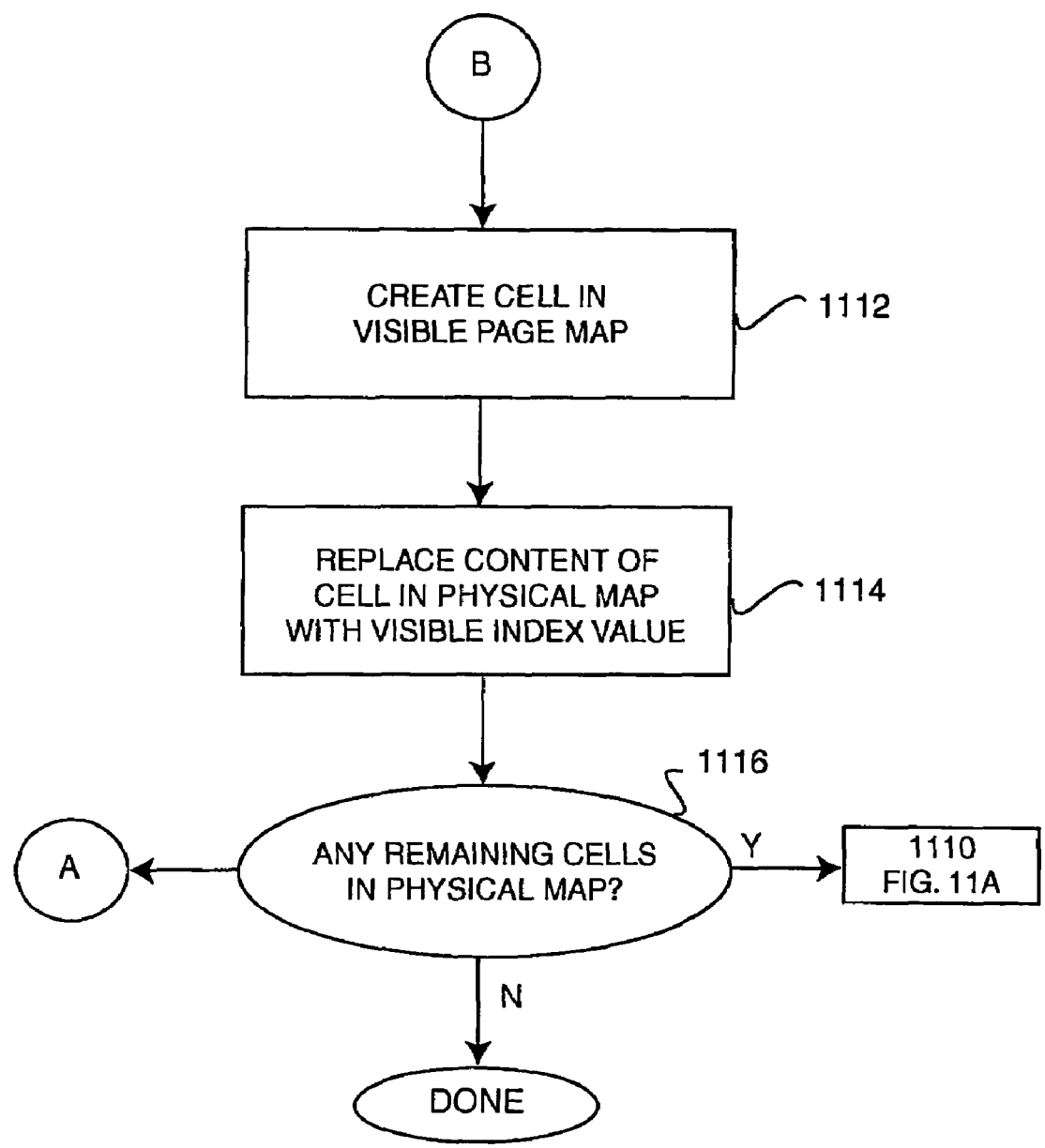
Figure 11C:
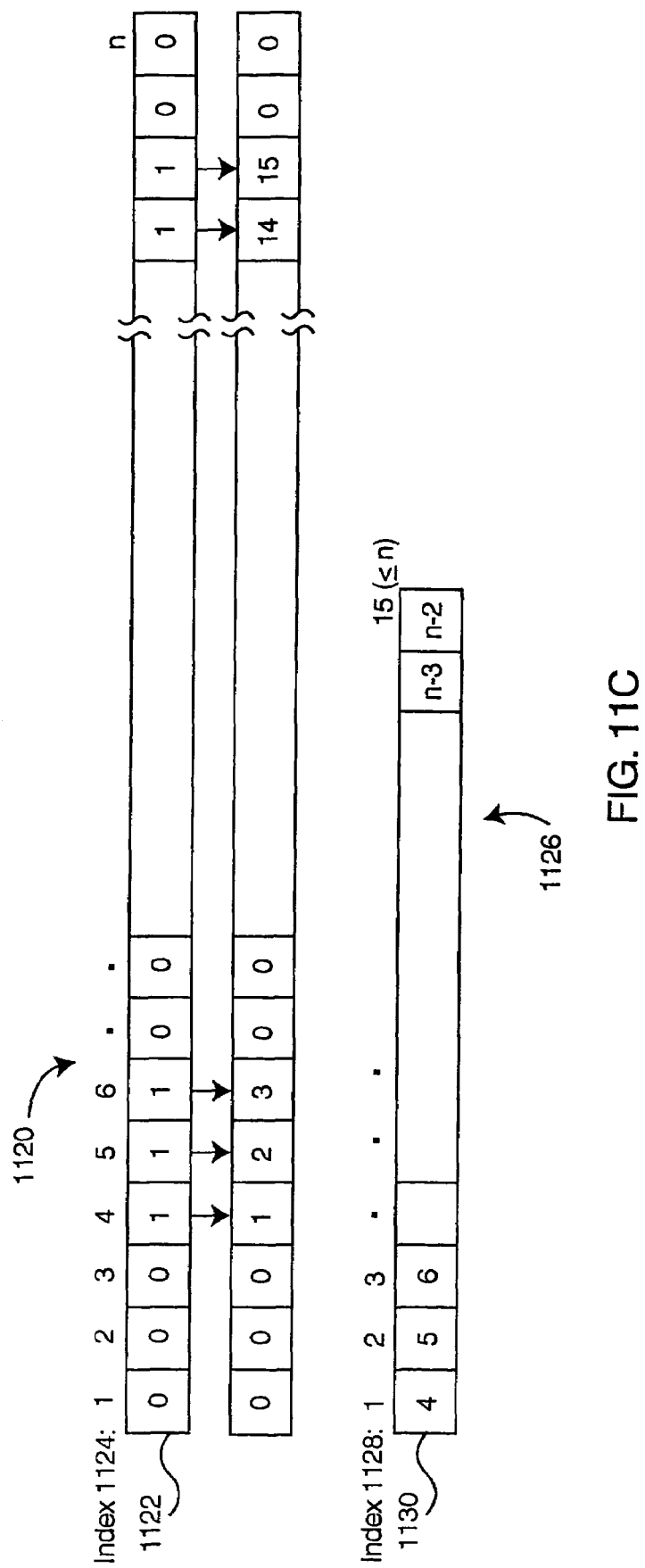
FIG. 11C is a data structure diagram of a physical page map and a visible page map for a particular user and report in accordance with one embodiment of the present invention.

At a step 1108 a physical page map for the report is created. In the described embodiment, an indexed array of cells is used to implement a physical page map for the report. FIG. 11C is data structure diagram of a physical page map and a visible page map, discussed below, as implemented in one embodiment of the present invention. An array of cells 1120 has a number of cells n that is the same as the number of pages in the entire report. A first cell 1122, shown by index 1124, corresponds to the first page in the report, a second cell corresponds to the second page in the report, and so on. Physical map 1120 is initially used to store information as to which pages can be viewed by the user. In the described embodiment, if the cell contains a zero, the page (which corresponds to the index number of the cell) cannot be viewed by the user. If it contains a one it can be viewed. Cells are populated with this binary data by comparing the user ACL with the ACL for each page in the report. At a step 1109 the program goes through and populates each entry in the physical page map.

Once the physical page map is created and populated with the correct page viewing information, at a step 1110 a cell in array 1120 is read. If the cell contains a one, control goes to a step 1112. If the cell contains a zero, control goes to a step 1116 where the program checks if there are any remaining cells. If there are, control returns to step 1110 where the next cell in the array is read and the process repeats. If the cell contains a one, the user can view that page. At step 1112 a cell is created in a visible page map. A visible page map is also an array of cells. In FIG. 11B a visible page map 1126 is shown with an index 1128 and an array of cells 1130. Each cell in visible map 1126 contains a non-zero numeric value. Each value in the cells corresponds to an index number of physical page map 1120.

Continuing with step 1112, when a cell in visible page map 1126 is created, the cell is populated with the index number of the cell in physical page map 1120 that contained the value one. For example, the first cell in array 1130 of visible map 1126 contains the value four since the fourth cell in map 1120 contains the first "one" value. The second cell contains a five since the fifth cell contains the second "one" value encountered in physical map 1120. The total number of cells in array 1130 is the total number of pages that the user can view. As shown, the last cell contains the value n-2, since the third to last cell in physical map 1120 contained the last "one" value.

While a visible page map cell is being created and populated in step 1112, the "one" value of the cell in physical map 1120 that caused the creation of the visible page cell is replaced with the index value of the newly created visible map cell at a step 1114. This substitution is shown in FIG. 11B. The fourth cell that contains the first one value is effectively unchanged since it matches index value one from index 1128. The one value in the fifth cell is replaced with "2" and the sixth cell with "3", and so on. Once the physical map cell is replaced with the visible page number (the index of visible map 1126 corresponds to effective page numbers of the "customized" report the user can view), control goes to step 1116 where the program checks if there are any remaining cells in physical map 1120. As implied by the described process, visible map 1126 is built dynamically as physical map 1120 is being read. The visible page map can be as long as or shorter (including zero cells) than the physical page map. In FIG. 11B, visible page map has 15 cells which means that the user is allowed to view a subset of 15 pages.

If there are no more cells, the process is done. A page number component on a page that can be viewed retrieves the effective page numbers from cells storing a value other than zero in physical map 1120. Each number is inserted into a page from the subset of pages as the user scrolls or navigates through the customized report. In the described embodiment this is done at the time the report is displayed to the user, initially showing the user page one of his report. The effective page number can be retrieved since the particular page in the report (that can be viewed) is aware of its actual or physical page number, which is used to index its physical page map. Using the page number/index to identify a cell location, the content of the cell can be retrieved. Because of the substitution operation at step 1114, the content is the visible or effective page number for that page.

Many reports, especially large ones, often begin with a table of contents ("TOC") to assist users in finding data in the report and to facilitate page navigation. Typically, a TOC reflects the structure of a report. Generally, most level-breaks are shown as separate items with corresponding page numbers. For example, a TOC can begin with "Eastern Region" at page 3 followed by "New York Office" at page 3 followed by Sales Rep. 124, and so on. Once all the Sales Reps for the New York Office are listed, the same is done for the "Connecticut Office" until all the offices in the Eastern Region are listed followed by the "Central Region" which may begin at page 120, for example, and a similar structure is repeated.

With page-level security, there are at least two ways to partition a TOC in the described embodiment. One is done when the users are aware that the portion of the report they can view is actually a portion of a larger report and allowed to see the actual page numbers, as opposed to effective page numbers, in their portion of the report as well as the listings, but not content, of other groups and sections in the report related to their portions of the report. This is useful when it is necessary to orient other users who may be able to see larger portions of the report as to where the first user is looking. In this context, where it is necessary to use actual page numbers, the TOC should display all items for the particular user and the surrounding structure of the report and have corresponding actual page numbers. In this case, the TOC does not need to be partitioned or pruned significantly since the user is aware that he is viewing perhaps a small portion of a large report and it is beneficial for all users that he be permitted to see the structure of data in his group, but not the actual contents of that data.

In probably the more likely context, the user believes or it is at least made to appear that the report that the user is viewing is an individually created report (e.g., one of a series of similar reports). In this scenario, the TOC is pruned to the point where it contains only the categories or groups of data that the particular user is allowed to see and the corresponding page numbers are the effective page numbers. In this context, it may not be important that other users be able to immediately orient themselves to pages the user is viewing. In the case of a sales representative, the TOC would likely just have a listing of each customer and perhaps a listing of individual orders made by each customer, and corresponding effective page numbers (i.e., the first customer data would begin on page one). In another example, the report for the New York Office manager would have a TOC that started with the "first" sales representative in the office until all sales reps in the office were listed.

Figure 12B:
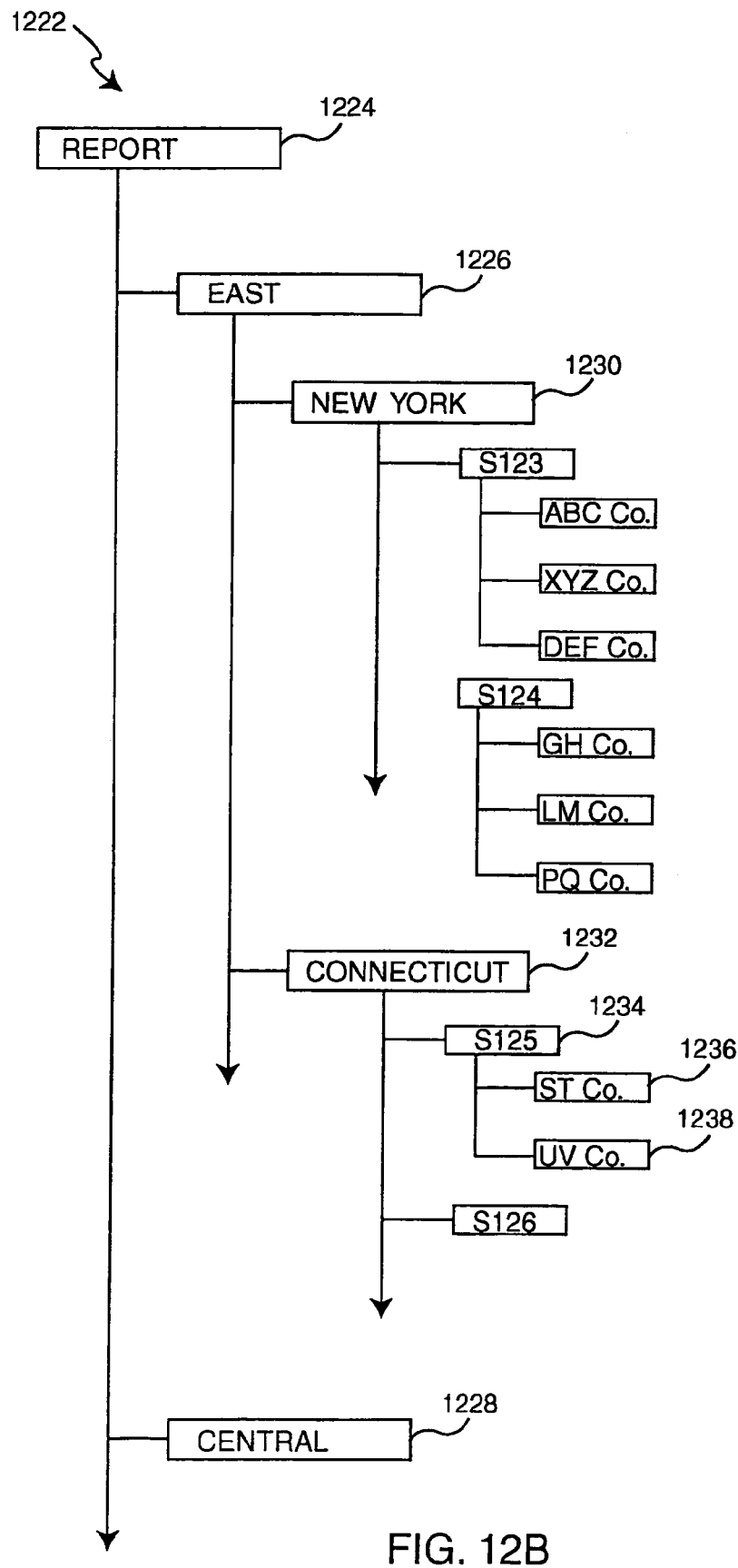
FIG. 12B is a logical hierarchy of table of content nodes that correspond to the table of content shown in FIG. 12A in accordance with one embodiment of the present invention.

FIGS. 12A and 12B depict a representation of a TOC and a corresponding schematic diagram of a table of contents for a report in accordance with one embodiment of the present invention. As stated above, a TOC in the described embodiment essentially reflects the group or level break structure of a report. A portion of a typical TOC is shown in FIG. 12A. Many online reports may not have an actual TOC page(s) (as would be expected in a book or printed report) as shown in FIG. 12A. It is shown here to help illustrate the concept of the corresponding schematic diagram (FIG. 12B) that shows content nodes. Thus, a report having page-level security and the other described features of the present invention does not have to include an actual TOC listing as shown in FIG. 12A. A TOC 1202 is organized according to the level breaks discussed above. They include Region 1204, Office 1206, and Sales Representative 1208. Also included are categories for Customer 1210, followed by Page 1212. Under these categories are numerous entries such as East 1214 and Central 1216 under Region 1204, New York 1218 and Connecticut 1220 under Office 1206 and so on. Each sales representative has one or more of customer entries with corresponding page numbers. In TOC 1202 the page numbers are actual page numbers. Thus, for example, data on customer PQ Co., one of S124's customers begins on page 23 of the full report and data on the Central region begins on page 108. In another context where the user is viewing what appears as an individual report, the page numbers shown are the effective page numbers.

FIG. 12B is a logical hierarchy of TOC nodes that correspond to TOC 1202 of FIG. 12A. A TOC hierarchy 1222 begins with a Report node 1224 having two direct descendant nodes East node 1226 and Central node 1228. Under East node 1226 are two office nodes, New York 1230 and Connecticut 1232 corresponding to TOC 1202. Similarly, nodes are shown for Sales Representatives and their customers under New York node 1230 and Connecticut node 1232 also reflecting TOC 1202. For the purposes of illustrating methods for creating an appropriate TOC in a report having page-level security of the present invention, nodes for Sales Representative 125 (node 1234) and associated customers ST Co. (node 1236) and UV Co. (node 1238) under Connecticut node 1232 are referenced below.

A TOC for a report of the present invention is created based on the list of security identifiers for a user. The creation and function of the list of security identifiers for a user (i.e., a user's security clearance or ACL) are described above. In the described embodiment, the options include whether the particular user should be given actual or effective page numbers in the report and which high-level nodes should be kept or pruned in the TOC.

Figure 13:
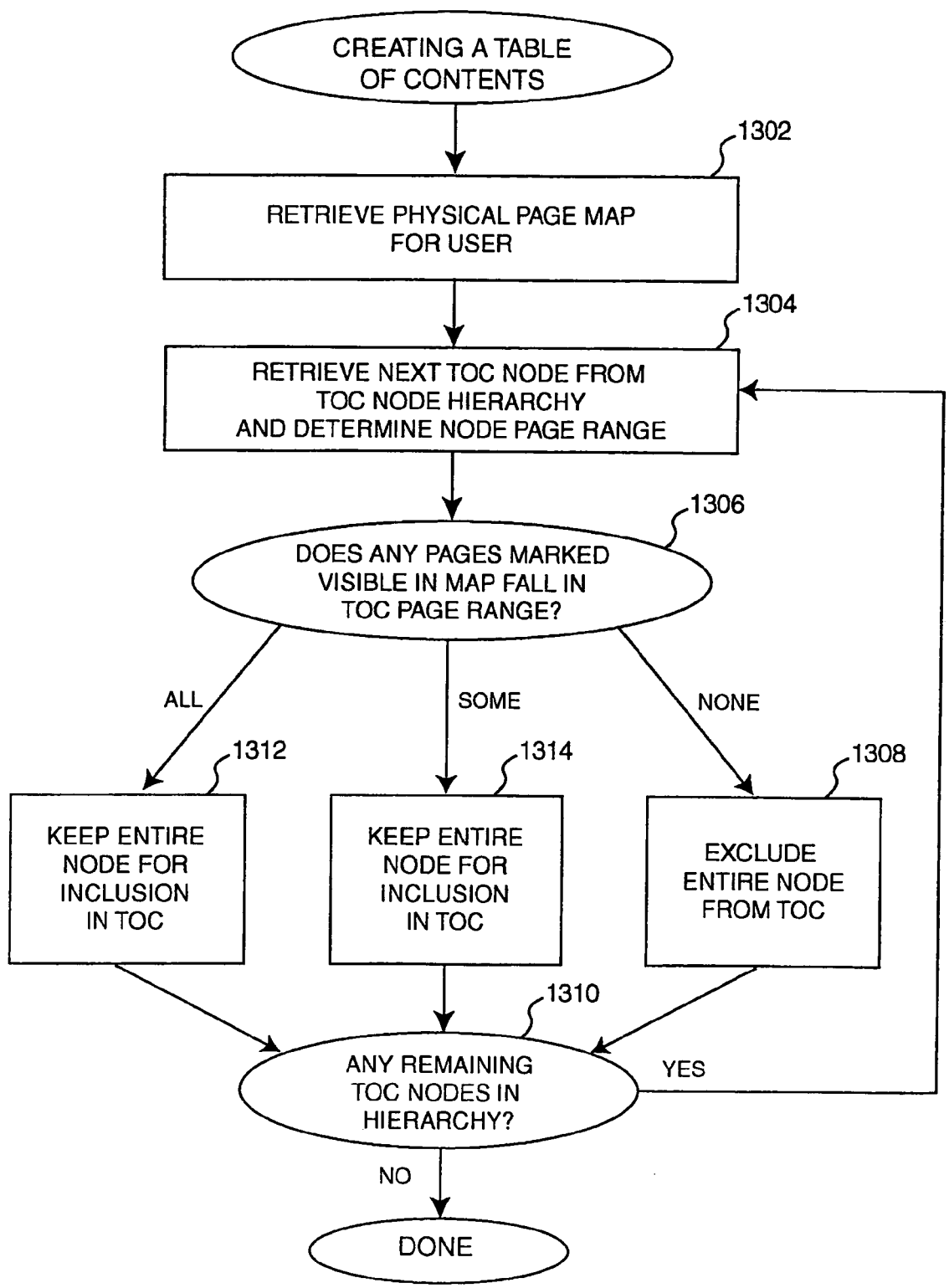
FIG. 13 is a flow diagram of a process for creating a table of contents for a report having page-level security in accordance with one embodiment of the present invention.

FIG. 13 is a flow diagram of a process for creating a table of contents for a report having page-level security in accordance with one embodiment of the present invention. At a step 1302 a physical page map associated with the particular user for whom the TOC is being constructed is retrieved. As described above the physical page map for a user can be described logically as an array of cells where each cell corresponds to a page in the entire report. Cells for pages that are visible to the user are marked as such in the map (e.g., they contain a "1"). In the described embodiment the map is created when creating the report for the user. Thus, the physical page map contains information on exactly which pages the user is allowed to view. In other preferred embodiments other data structures (such as a b-tree or hash table) indicating which pages the user can view can be used.

At a step 1304 the report generation program retrieves a TOC node from a TOC node hierarchy and determines the pages covered by the node. A TOC node hierarchy is created and closely reflects the structure of the report in terms of level breaks and other data categories, such as customers in the examples shown. The hierarchy is created differently when printed and when viewed. When the TOC hierarchy is printed, it is created in its entirety at the point it is printed. However, when the TOC is viewed interactively, the program expands each TOC node interactively in response to a request from the user. Initially only the top level is visible. A user can then request expanding a node to see the level below it and continue doing so until a leaf node is reached. Nodes in the hierarchy contain a page number range indicating actual pages in the report covered by a particular node. For example, East node 1226 has a page range of 2 through 107 and the page range for the S125 node is 31 to 44. A node level in the hierarchy generally corresponds to a level or group break in the hierarchy such as Region 1204, Office 1206, or Customer 1210. These level breaks are also shown in FIGS. 4A and 4B.

At a step 1306 the report generation program determines if the user can see the contents of the TOC node retrieved at step 1304. To do this, the program determines if any of the pages in the page range specified for that node are visible. The program does this by consulting the user's physical page map. The TOC node retrieved is the node whose contents the user requests to see further details (i.e., the node the user desires to expand as mentioned above). If none of the pages in the TOC node page range match pages marked as visible in the physical page map, control goes to a step 1308 where the entire TOC node is excluded from the user's TOC since none of the sub-nodes below the current node can be seen the user. Control then goes to a step 1310 where the system checks whether there are any remaining TOC nodes in the hierarchy. If there nodes in the hierarchy, control returns to step 1304 and the process repeats. If there are no more nodes, the process is complete.

If all pages in the TOC node page range are included in the pages marked as visible to the user in the physical map, the entire node is included in the user's TOC since all pages in that node can be seen by the user at a step 1312. Inclusion of the node also implies inclusion of nodes below it in the hierarchy since those nodes have page ranges that are subsets of the parent TOC node. Control then goes to step 1310 where the program checks for any remaining nodes in the hierarchy. If there are nodes left, control returns to step 1304 otherwise the process is complete.

If some of the pages in the TOC page range are visible to the user, control goes to a step 1314. For example, this would arise if the page range for the New York office node having a page range of 2 through 30 was being compared to pages visible to sales representative 124 (pages 13 to 30). The sales representative is allowed to view some of the pages in the New York office TOC node but only pages 13 to 30. At step 1314, the program substitutes the contents of the TOC node for the TOC node itself and then repeats the visibility check for each of the content nodes. Control then goes to step 1310 as described above.

3. Computer System Embodiments

As can be drawn from the description above, the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program, such as the report generation program, stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system, such as a report generation server that also stores the single report as described above, to perform the required operations.

Figure 14:
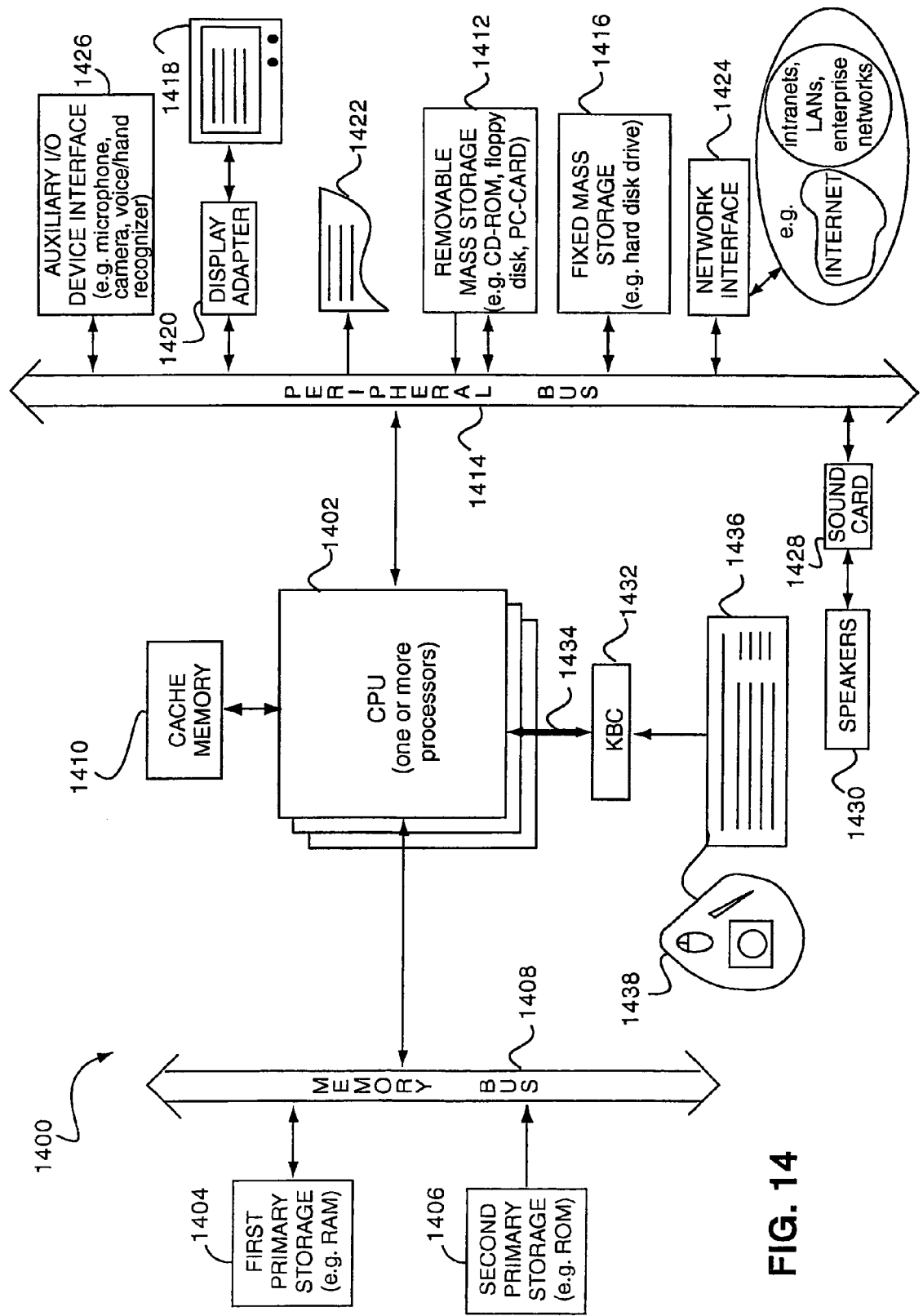
FIG. 14 is a schematic illustration of a network-based computing system on which the present invention may be implemented.

FIG. 14 is a block diagram of a general purpose computer system 1400 suitable for carrying out the processing in accordance with one embodiment of the present invention. FIG. 14 illustrates one embodiment of a general purpose computer system. Other computer system architectures and configurations can be used for carrying out the processing of the present invention. Computer system 1400, made up of various subsystems described below, includes at least one microprocessor subsystem (also referred to as a central processing unit, or CPU) 1402. That is, CPU 1402 can be implemented by a single-chip processor or by multiple processors. It should be noted that in re-configurable computing systems, CPU 1402 can be distributed amongst a group of programmable logic devices. In such a system, the programmable logic devices can be reconfigured as needed to control the operation of computer system 1400. In this way, the manipulation of input data is distributed amongst the group of programmable logic devices. CPU 1402 is a general purpose digital processor which controls the operation of the computer system 1400. Using instructions retrieved from memory, the CPU 1402 controls the reception and manipulation of input data, and the output and display of data on output devices.

CPU 1402 is coupled bi-directionally with a first primary storage 1404, typically a random access memory (RAM), and uni-directionally with a second primary storage area 1406, typically a read-only memory (ROM), via a memory bus 1408. As is well known in the art, primary storage 1404 can be used as a general storage area and as scratch-pad memory, and can also be used to store input data and processed data. It can also store programming instructions and data, in the form of a report object executable, visible and physical maps, TOC hierarchies, SIDs and ACLs, and a report with page-level security, in addition to other data and instructions for processes operating on CPU 1402, and is used typically used for fast transfer of data and instructions in a bi-directional manner over the memory bus 1408. Also as well known in the art, primary storage 1406 typically includes basic operating instructions, program code, data and objects used by the CPU 1402 to perform its functions. Primary storage devices 1404 and 1406 may include any suitable computer-readable storage media, described below, depending on whether, for example, data access needs to be bi-directional or uni-directional. CPU 1402 can also directly and very rapidly retrieve and store frequently needed data in a cache memory 1410.

A removable mass storage device 1412 provides additional data storage capacity for the computer system 1400, and is coupled either bi-directionally or uni-directionally to CPU 1402 via a peripheral bus 1414. For example, a specific removable mass storage device commonly known as a CD-ROM typically passes data uni-directionally to the CPU 1402, whereas a floppy disk can pass data bi-directionally to the CPU 1402. Storage 1412 may also include computer-readable media such as magnetic tape, flash memory, signals embodied on a carrier wave, PC-CARDS, portable mass storage devices, holographic storage devices, and other storage devices. A fixed mass storage 1416 also provides additional data storage capacity and is coupled bi-directionally to CPU 1402 via peripheral bus 1414. The most common example of mass storage 1416 is a hard disk drive. Generally, access to these media is slower than access to primary storages 1404 and 1406.

Mass storage 1412 and 1416 generally store additional programming instructions, data, and the like that typically are not in active use by the CPU 1402. It will be appreciated that the information retained within mass storage 1412 and 1416 may be incorporated, if needed, in standard fashion as part of primary storage 1404 (e.g. RAM) as virtual memory.

In addition to providing CPU 1402 access to storage subsystems, the peripheral bus 1414 is used to provide access other subsystems and devices as well. In the described embodiment, these include a display monitor 1418 and adapter 1420, a printer device 1422, a network interface 1424, an auxiliary input/output device interface 1426, a sound card 1428 and speakers 1430, and other subsystems as needed.

The network interface 1424 allows CPU 1402 to be coupled to another computer, computer network, or telecommunications network using a network connection as shown. Through the network interface 1424, it is contemplated that the CPU 1402 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1402 can be used to connect the computer system 1400 to an external network and transfer data according to standard protocols. That is, method embodiments of the present invention may execute solely upon CPU 1402, or may be performed across a network such as the Internet, intranet networks, or local area networks, in conjunction with a remote CPU that shares a portion of the processing. Additional mass storage devices (not shown) may also be connected to CPU 1402 through network interface 1424.

Auxiliary I/O device interface 1426 represents general and customized interfaces that allow the CPU 1402 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1402 is a keyboard controller 1432 via a local bus 1434 for receiving input from a keyboard 1436 or a pointer device 1438, and sending decoded symbols from the keyboard 1436 or pointer device 1438 to the CPU 1402. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 1408, peripheral bus 1414, and local bus 1434 are illustrative of any interconnection scheme serving to link the subsystems. For example, a local bus could be used to connect the CPU to fixed mass storage 1416 and display adapter 1420. The computer system shown in FIG. 14 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, while level breaks are illustrated with examples of data generally in the same format, it is possible to have level breaks between different categories of data having very different formats and characteristics, such as a brokerage statement which may have a section listing stock positions and other sections for account activity and personal account information. The page level security constructs described above can apply equally well to such reports. Accordingly, the present embodiments are to be considered as illustrative and not restrictive, and the invention is not to be limited to the details given herein, but may be modified within the scope and equivalents of the appended claims.

What is claimed is:

1. A method of creating a report having security based on content of data contained in the report, the method comprising:
retrieving data to be contained in a report and associated security information;
determining whether to generate a security tag associated with a new page;
forming a security tag from the security information that has been retrieved;
associating the security tag with a new page in the report wherein the data is placed on the new page such that security is implemented at the page level for the new page in the report, wherein the security tag indicates a set of users permitted to view the new page in the report, wherein the new page is a representation of a page that is at least one of printable and viewable; and
placing subsequent data on pages having the security tag associated therewith until another security tag is formed such that data in the report is organized based on a plurality of security tags such that security is implemented at the page level for the pages associated with the plurality of security tags.

2. A method as recited in claim 1, wherein the size of the page is determined by an amount of data that would fit on the page, wherein the page is a printed page.

3. A method as recited in claim 1, wherein the page represents an amount of content that would fit on a printed page.

4. A method as recited in claim 1, wherein the page has a page format suitable for printing.

5. A method as recited in claim 1, wherein the report is generated to include a plurality of pages having associated security tags prior to a request for access to the report, wherein each of the plurality of pages is a representation of a page that is at least one of printable and viewable, thereby eliminating a need for performing repagination in response to a request for access to the report.

6. A method as recited in claim 1, wherein the report is generated from one executable component.

7. A method as recited in claim 1, wherein the security information includes one or more security identifiers, wherein forming a security tag further comprises:
retrieving the one or more security identifiers; and
combining the one or more security identifiers thereby creating the security tag.

8. A method as recited in claim 7 wherein associating the security tag with a new page in the report further comprises:
associating a role adopted from a security system with a data row;
mapping the one or more security identifiers in the security tag with one or more roles adopted from the security system thereby creating a security tag adaptable by the security system; and
associating the security tag adaptable by the security system to a page in the report.

9. A method as recited in claim 8 wherein the security system has a plurality of roles and a plurality of users.

10. A method as recited in claim 8 wherein mapping security identifiers in the security tag with one or more roles further comprises:
identifying a data column in the retrieved data; and
identifying one or more roles in the security system that correspond to the data column.

11. A method as recited in claim 10 further comprising deriving translation rules to map the one or more roles in the security system with the data column.

12. A method as recited in claim 1 further comprising:
sorting the data based on one or more data breaks wherein a data break is caused by a change in category of the data.

13. A method as recited in claim 12 wherein a data break is a level break in the data.

14. A method as recited in claim 1 further comprising:
determining a first role in a security system that corresponds directly to the user;
determining one or more secondary roles that correspond indirectly to the user; and
combining the first role with the one or more secondary roles thereby creating a security clearance for the user.

15. A method as recited in claim 14 further comprising:
comparing the security clearance for the user with one or more of the plurality of security tags to derive a subset of pages in the report that can be viewed by the user.

16. The method as recited in claim 1, wherein the security tag does not indicate that the set of users is permitted to view all pages in the report.

17. A method of viewing a report having a security tag associated with pages in the report such that a user can only view data authorized to be shown to the user, the method comprising:
retrieving a report having a superset of pages, wherein each of the superset of pages is a representation of a page that is at least one of printable and viewable, one or more pages from the superset of pages each having a security tag associated therewith such that a plurality of security tags are associated with the superset of pages of the report;
obtaining a list of security identifiers associated with the user;
comparing the list of security identifiers associated with the user with the plurality of security tags associated with the superset of pages of the report;

deriving a subset of pages from the superset of pages based on the comparison such that the subset of pages only contains data that the user is authorized to view;

presenting the subset of pages as a report to the user;

renumbering pages in the subset of pages;

wherein renumbering pages in the subset of pages further comprises:

creating a first page map having a first plurality of complete cells for the superset of pages wherein a complete cell represents a page;

determining whether a cell from the first plurality of complete cells represents a page the user is authorized to view; and creating a second page map having a second plurality of partial cells wherein a partial cell represents a viewable page.

18. A method as recited in claim 17, wherein the size of the page is determined by an amount of data that would fit on the page, wherein the page is a printed page.

19. A method as recited in claim 17, wherein the page represents an amount of content that would fit on a printed page.

20. A method as recited in claim 17, wherein the page has a page format suitable for printing.

21. A method as recited in claim 17 wherein creating a first page map further comprises:

comparing the list of security identifiers associated with the user with a the plurality of security tags associated with the superset or pages of the report; and associating a value with each one of the first plurality of complete cells based on whether the user can view a particular page.

22. A method as recited in claim 17 wherein determining whether a cell from the first plurality of complete cells represents a page further comprises: examining the content of one of the first plurality of complete cells.

23. A method as recited in claim 17 wherein creating a second page map further comprises:

creating a partial page map cell that corresponds to a complete cell representing a page in the report; and inserting a first page map index value corresponding to the complete cell into the partial cell.

24. A method as recited in claim 17 further comprising:

inserting a second page map index value into a complete cell corresponding to a particular page the user is authorized to view.

25. A method as recited in claim 17 further comprising:

inserting a partial page number from the first page map into a page number component in a page in the report, the partial page number corresponding to a page in the superset of pages that the user is authorized to view.

26. A method as recited in claim 17 wherein comparing the list of security identifiers associated with the user with the plurality of security tags associated with the superset of pages of the report comprises:

mapping one or more level break identifiers in each of the plurality of security tags with one or more security identifiers in the list of security identifiers associated with the user.

27. A method as recited in claim 26 wherein comparing the list of security identifiers further comprises comparing the level break identifiers in one of the plurality of security tags with the security identifiers in the list of security identifiers associated with the user.

28. A method as recited in claim 17 wherein the list of security identifiers is derived from a security system.

29. A method as recited in claim 17 wherein deriving a subset of pages from the superset of pages further comprises:

determining a commonality between one of the plurality of security tags associated with the superset of pages of the report and the list of security identifiers associated with the user; and including a page of the superset of pages in the subset of pages if the one of the plurality of security tags and the list of security identifiers associated with the user pass the threshold level of commonality when compared.

30. A method as recited in claim 29 wherein the threshold level of commonality is having one term in the one of the plurality of security tags and the list of security identifiers in common.

31. A method as recited in claim 17 further comprising deriving content information including page numbers related to the subset of pages.

32. A method as recited in claim 31 wherein the content information only contains information related to the subset of pages.

33. A method as recited in claim 32, wherein the content information generally reflects a level break structure of the subset of pages, wherein each of the plurality of security tags is associated with a level break.

34. The method as recited in claim 17, wherein the security tag associated with each of the one or more pages from the superset of pages does not indicate permission to access all of pages in the report.

35. The method as recited in claim 17, wherein the security tag associated with each of the subset of pages does not indicate that the user has permission to view all pages in the report.

36. A computer-readable storage medium storing thereon computer-readable instructions for viewing a report having a security tag associated with pages in the report such that a user can only view data authorized to be shown to the user, comprising:

instructions for retrieving a report having a superset of pages, wherein each of the superset of pages is a representation of a page that is at least one of printable and viewable, one or more pages from the superset of pages each having a security tag associated therewith such that a plurality of security tags are associated with the superset of pages of the report;

instructions for obtaining a list of security identifiers associated with the user;

instructions for comparing the list of security identifiers associated with the user with the plurality of security tags associated with the superset of pages of the report;

instructions for deriving a subset of pages from the superset of pages based on the comparison such that the subset of pages only contains data that the user is authorized to view;

instructions for presenting the subset of pages as a report to the user;

renumbering pages in the subset of pages;

instructions for creating a first page map having a first plurality of complete cells for the superset of pages wherein a complete cell represents a page;

instructions for determining whether a cell from the first plurality of complete cells represents a page the user is authorized to view; and instructions for creating a second page map having a second plurality of partial cells wherein a partial cell represents a viewable page.

37. An apparatus for creating a report having security based on content of data contained in the report, comprising:

a processor; and a memory, at least one of the processor or the memory being adapted for:

retrieving data to be contained in a report and associated security information;

determining whether to generate a security tag associated with a new page;

forming a security tag from the security information that has been retrieved;

associating the security tag with a new page in the report wherein the data is placed on the new page such that security is implemented at the page level for the new page in the report, wherein the security tag indicates a set of users permitted to view the new page in the report, wherein the new page is a representation of a page that is at least one of printable and viewable; and placing subsequent data on pages having the security tag associated therewith until another security tag is formed such that data in the report is organized based on a plurality of security tags such that security is implemented at the page level for the pages associated with the plurality of security tags.

* * * * *